US011816126B2

(12) United States Patent
Wilson et al.

(10) Patent No.: US 11,816,126 B2
(45) Date of Patent: Nov. 14, 2023

(54) LARGE SCALE UNSTRUCTURED DATABASE SYSTEMS

(71) Applicant: MongoDB, Inc., New York, NY (US)

(72) Inventors: Craig Geppert Wilson, Dallas, TX (US); David Robert Golub, Mineola, NY (US); Mehrab Mohammad Hoque, New York, NY (US); Adinoyi Wisdom Omuya, Union City, NJ (US); Charles Robert Kalmanek, Jr., Short Hills, NJ (US); Eliot Horowitz, New York, NY (US)

(73) Assignee: MongoDB, Inc., New York, NY (US)

( * ) Notice: Subject to any disclaimer, the term of this patent is extended or adjusted under 35 U.S.C. 154(b) by 0 days.

(21) Appl. No.: 17/894,386

(22) Filed: Aug. 24, 2022

(65) Prior Publication Data

US 2022/0405298 A1 Dec. 22, 2022

Related U.S. Application Data

(63) Continuation of application No. 16/895,340, filed on Jun. 8, 2020, now Pat. No. 11,461,356, which is a
(Continued)

(51) Int. Cl.
*G06F 16/00* (2019.01)
*G06F 16/25* (2019.01)
(Continued)

(52) U.S. Cl.
CPC ........ *G06F 16/258* (2019.01); *G06F 16/2272* (2019.01); *G06F 16/2471* (2019.01); *G06F 16/252* (2019.01); *G06F 16/951* (2019.01)

(58) Field of Classification Search
None
See application file for complete search history.

(56) References Cited

U.S. PATENT DOCUMENTS 6,748,393 B1 6/2004 Kapoor et al.
6,973,452 B2 12/2005 Metzger et al.
(Continued)

OTHER PUBLICATIONS

"Optimizing the execution of multiple data analysis queries on parallel and distributed environments", by H. Andrade;T. Kurc; A. Sussman; J. Saltz. IEEE Transactions on Parallel and Distributed Systems, vol. 15, Issue: 6; Year 2004 (Year: 2004).*

*Primary Examiner* — Hasanul Mobin
(74) *Attorney, Agent, or Firm* — Wolf, Greenfield & Sacks, P.C.

(57) ABSTRACT

Systems, methods, and computer-readable media provide techniques for on-demand access to object data hosted in distributed object storage. A query is received for the distributed object storage database, wherein the distributed object storage database includes first object data stored in a first data center at a first geographical location, and second object data stored in a second data center at a second geographical location. It is determined that the query is for at least a portion of the first object data stored by the first data center. The query is transmitted to a first computing device in the first data center. Results are received from the first computing device for the query, and the results are provided in response to the received query.

16 Claims, 9 Drawing Sheets

Related U.S. Application Data continuation-in-part of application No. 16/294,227, filed on Mar. 6, 2019, now Pat. No. 11,288,282, which is a continuation of application No. 14/992,225, filed on Jan. 11, 2016, now Pat. No. 10,262,050.

(60) Provisional application No. 62/861,540, filed on Jun. 14, 2019, provisional application No. 62/232,979, filed on Sep. 25, 2015.

(51) Int. Cl.
  *G06F 16/951* (2019.01)
  *G06F 16/2458* (2019.01)
  *G06F 16/22* (2019.01)

(56) References Cited

U.S. PATENT DOCUMENTS

| | | | |
|---|---|---|---|
| 8,572,031 B2 | 10/2013 | Merriman et al. | |
| 8,775,070 B1 | 7/2014 | Bhatia | |
| 9,442,995 B2* | 9/2016 | Pareek | G06F 16/27 |
| 9,628,404 B1* | 4/2017 | Goffinet | G06F 16/2365 |
| 10,262,050 B2 | 4/2019 | Bostic et al. | |
| 10,457,245 B2 | 10/2019 | Fukumoto et al. | |
| 10,467,245 B2* | 11/2019 | Sirer | G06F 16/27 |
| 11,012,806 B2* | 5/2021 | Tan | H04W 4/18 |
| 11,012,816 B2 | 5/2021 | Narra et al. | |
| 11,461,356 B2 | 10/2022 | Wilson et al. | |
| 2006/0259160 A1* | 11/2006 | Hood | G05B 19/4188 700/20 |
| 2009/0254572 A1 | 10/2009 | Redlich et al. | |
| 2010/0057764 A1* | 3/2010 | Williamson | G06F 16/283 707/E17.05 |
| 2010/0094893 A1* | 4/2010 | Dettinger | G06F 16/2425 707/764 |
| 2010/0250497 A1* | 9/2010 | Redlich | H04L 63/105 707/661 |
| 2011/0258225 A1* | 10/2011 | Taylor | G06F 16/2272 707/769 |
| 2012/0166390 A1 | 6/2012 | Merriman et al. | |
| 2012/0215740 A1* | 8/2012 | Vaillant | G06F 16/273 707/634 |
| 2013/0151558 A1* | 6/2013 | Chercoles Sanchez | G06F 16/275 707/E17.014 |
| 2014/0237386 A1* | 8/2014 | Barrington | G06F 16/50 715/753 |
| 2015/0254344 A1* | 9/2015 | Kulkarni | G06F 16/7847 707/747 |
| 2016/0026718 A1* | 1/2016 | Hopkins | G06F 16/9535 707/715 |
| 2020/0301941 A1 | 9/2020 | Wilson et al. | |

* cited by examiner

LARGE SCALE UNSTRUCTURED DATABASE SYSTEMS

CROSS-REFERENCE TO RELATED APPLICATIONS

This application is a Continuation of U.S. patent application Ser. No. 16/895,340, filed Jun. 8, 2020, entitled "Large Scale Unstructured Database Systems", which claims priority under 35 U.S.C. § 119(e) to 62/861,540, filed Jun. 14, 2019, and entitled "Large Scale Unstructured Database Systems," which is hereby incorporated by reference in its entirety. Application Ser. No. 16/895,340 is a continuation-in-part of U.S. patent application Ser. No. 16/294,227, entitled "Distributed Database Systems and Methods With Pluggable Storage Engines," filed on Mar. 6, 2019, which is a continuation of U.S. patent application Ser. No. 14/992,225, filed on Jan. 11, 2016, entitled "Distributed Database Systems and Methods With Pluggable Storage Engines," which claims priority under 35 U.S.C. § 119(e) to 62/232,979, filed Sep. 25, 2015, and entitled "Distributed Database Systems and Methods With Pluggable Storage Engines." All of these applications are hereby incorporated by reference in their entirety.

BACKGROUND

Technical Field

The present invention relates to database systems, and in particular to large scale unstructured databases, such as data lakes.

Background Discussion

Multiple data storage formats exist for storing data in a database. Storage engines exist that are capable of storing data in a particular data format. Applications, system processes, and other programs that access the data instruct the storage engine to perform a database operation, causing the storage engine to interact with the data in the expected data format.

SUMMARY

Stated broadly, various aspects describe systems and methods for large scale unstructured database systems. According to some embodiments, the large scale unstructured database systems can include the ability to support a range of operations such as create, read, update and delete operations using a storage hierarchy, such as main memory and disk, which are considered to be online storage. Online storage refers to database data kept in active memory or on executing resources that enable fast operation execution (e.g., read, write, modify, etc.) that can be on premise physical hardware or can be instantiated cloud resources. Such online data can be accessed quickly, for example, in response to queries on the database.

The inventors have realized that as the amount of data in a database system grows, users often want to be able to perform read operations on some data, such as historical data, but do not need to perform create, update or delete operations on this data. According to some embodiments, databases and/or database services can be architected that provide support for read operations and use a different type of storage from the main memory or disk to store the data, including distributed object storage. Distributed object storage can provide one or more features, such as a high data durability guarantee, a significant cost savings compared with the disk technologies typically used in database systems, and/or can be available from one or more data center locations, which can facilitate using the distributed object storage to provide database services to clients in many locations.

The inventors have further realized that distributed object storage can be slow to access, may not support random access write or update operations, and/or may have other deficiencies compared to using main memory or disk. For example, object data from a distributed object storage can be stored as a data lake that can provide a massive storage volume at low cost that is, however, slow to access. A data lake approach that involves storing data as a blob or object is typically optimized according to the specifications of a cloud-based object storage provider, which can make it more difficult to retrieve the data based on structural constraints of the object storage service, the data lake's architecture, and/or the like. The inventors have appreciated that distributed object storage can have one or more deficiencies, such as supporting append-only writes rather than writes to an arbitrary location, providing read access with higher latency and lower throughput than memory or disk, requiring complex configuration procedures to allow object data to be queryable, and/or failing to support coherent online and offline databases, including only spinning-up compute resources to access offline portions of a database when needed. Implementations of database systems using distributed object storage have further imposed limitations such as requiring structured queries (e.g., using SQL) and flattening data into tables in order to search the data (e.g., which can lose fidelity).

Such issues can be exacerbated when used in conjunction with dynamic schema databases, such as the well-known MONGODB database. Due to the dynamic schema, many issues that are not experienced with defined schema approaches (e.g., the known SQL approach) create additional complexities for implementing and integrating with object storage formats. The complexities can include, for example, conversion from one or more storage data formats into a binary representation of schema-less data as "documents", such as the well-known BSON format, that is used for processing and querying data in the database system, and processing the data in a continuous or streaming fashion in order to reduce the amount of time before a client of the database system receives the results of their query.

In various embodiments, virtual "collections" of distributed object data can be specified and queried in a manner that is directly analogous to querying collections in a document database system or querying tables in a relational database system. In some embodiments, the techniques can allow a customer to specify the buckets of files in the data lake and/or to provide information regarding the files in the data lake that can be used to generate the virtual collections (e.g., in a storage configuration file or by executing commands such as Data Definition Language commands). In some embodiments, the information used to build the virtual collections can be specified in the file names, such as by using fields of the file names. The techniques can include using the information in the file names to partition the data in the data lake to quickly limit and identify relevant documents to a particular query. The query can be executed in geographical proximity to the data, and the query can be divided across multiple processing nodes, such that each processing node can process an associated set of files, and the results of each processing node can be combined to generate the full set of query results.

Some embodiments relate to a method of querying data hosted in a distributed object storage database. The method includes receiving a query for the distributed object storage database, wherein the distributed object storage database includes first object data stored in a first data center at a first geographical location, and second object data stored in a second data center at a second geographical location. The method includes determining the query is for at least a portion of the first object data stored by the first data center, transmitting the query to a first computing device in the first data center, receiving results from the first computing device for the query, and providing the results in response to the received query.

In some examples, the first computing device is configured to distribute a first portion of the query to a second computing device in the first data center to query a first portion of the first object data and a second portion of the query to a third computing device in the first data center to query a second portion of the first object data, such that the second computing device and the third computing device can read the respective first and second portions of the first object data and perform the respective first and second portion of the query in parallel. The first computing device is configured to receive results from the second computing device and third computing device responsive to the second computing device and third computing device performing the respective first and second portion of the query, and combine the results.

In some examples, the method further includes accessing a storage configuration file to configure the distributed object storage database, wherein the storage configuration file comprises data indicative of a first data store comprising the first object data and a second data store comprising the second object data, a collection within the first data store comprising a subset of data from the first data store, a subset of data from the second data store, or both.

In some examples, the storage configuration file further includes data indicative of one or more of a third data store comprising an online database cluster, and a fourth data store comprising a Hypertext Transfer Protocol (HTTP) store, and the method further includes processing the storage configuration file to determine a collection comprising the first data store, the second data store, and one or more of the third data store and the fourth data store.

In some examples, the first computing device is configured to distribute a first portion of the query to a second computing device in the first data center to query the first data store, and a second portion of the query to a third computing device to query the online database cluster.

In some examples, the first computing device is configured to distribute a first portion of the query to a second computing device in the first data center to query the first data store, and a second portion of the query to a third computing device to query the HTTP store.

In some examples, the first object data of the first data store includes a first set of objects, wherein each object of the first set of objects comprises an associated object name comprising a set of ordered fields, the second object data of the second data store comprises a second set of objects, wherein each object of the second set of objects comprises an associated object name comprising a set of ordered fields, and the storage configuration file specifies the first set of objects and the second set of objects using the associated object names.

In some examples, the method further includes processing at least a portion of the query using a partition mapping syntax to specify a partition associated with the portion of the query using a range of a field, wherein the partition includes a set of partition objects comprising a subset of the first set of objects, a subset of the second set of objects, or both, wherein each object in the set of partition objects comprises an associated object name with a field value within the range of the field.

In some examples, the first set of objects are in a first collection within the first data store, the second set of objects are in a second collection within the first data store, and the storage configuration file specifies the first collection using a first keyword comprising a first set of field values that matches the object names of the objects in the first set of objects to determine the first collection, and specifies the second collection using a second keyword comprising a second set of field values that matches the object names of the objects in the second set of objects to determine the second collection.

In some examples, the method includes receiving the results from the first computing device for the query and providing the results in response to the received query includes writing the results of the query to the distributed object storage database.

In some examples, the method includes receiving the results from the first computing device for the query and providing the results in response to the received query comprises writing the results of the query to an online database cluster.

Some embodiments relate to a non-transitory computer-readable media comprising instructions that, when executed by one or more processors on a computing device, are operable to cause the one or more processors to perform receiving a query for the distributed object storage database, wherein the distributed object storage database comprises first object data stored in a first data center at a first geographical location, and second object data stored in a second data center at a second geographical location. The instructions are operable to cause the one or more processors to perform determining the query is for at least a portion of the first object data stored by the first data center, transmitting the query to a first computing device in the first data center, receiving results from the first computing device for the query, and providing the results in response to the received query.

In some examples, the first computing device is configured to distribute a first portion of the query to a second computing device in the first data center to query a first portion of the first object data, and a second portion of the query to a third computing device in the first data center to query a second portion of the first object data, such that the second computing device and the third computing device can read the respective first and second portions of the first object data and perform the respective first and second portion of the query in parallel. The first computing device is further configured to receive results from the second computing device and third computing device responsive to the second computing device and third computing device performing the respective first and second portion of the query, and combine the results.

In some examples, the instructions are further operable to cause the one or more processors to perform accessing a storage configuration file to configure the distributed object storage database, wherein the storage configuration file comprises data indicative of a first data store comprising the first object data and a second data store comprising the second object data, and a collection within the first data store comprising a subset of data from the first data store, a subset of data from the second data store, or both.

In some examples, the storage configuration file further includes data indicative of one or more of a third data store comprising an online database cluster, and a fourth data store comprising a Hypertext Transfer Protocol (HTTP) store, and the method further comprises processing the storage configuration file to determine a collection comprising the first data store, the second data store, and one or more of the third data store and the fourth data store.

In some examples, the first computing device is configured to distribute a first portion of the query to a second computing device in the first data center to query the first data store, and a second portion of the query to a third computing device to query the online database cluster.

In some examples, the first computing device is configured to distribute a first portion of the query to a second computing device in the first data center to query the first data store, and a second portion of the query to a third computing device to query the HTTP store.

In some examples, the first object data of the first data store comprises a first set of objects, wherein each object of the first set of objects comprises an associated object name comprising a set of ordered fields, the second object data of the second data store comprises a second set of objects, wherein each object of the second set of objects comprises an associated object name comprising a set of ordered fields, and the storage configuration file specifies the first set of objects and the second set of objects using the associated object names.

In some examples, the instructions are further operable to cause the one or more processors to perform processing at least a portion of the query using a partition mapping syntax to specify a partition associated with the portion of the query using a range of a field, wherein the partition includes a set of partition objects comprising a subset of the first set of objects, a subset of the second set of objects, or both, wherein each object in the set of partition objects comprises an associated object name with a field value within the range of the field.

Some embodiments relate to a system including a memory storing instructions, and a processor configured to execute the instructions to perform receiving a query for the distributed object storage database, wherein the distributed object storage database includes first object data stored in a first data center at a first geographical location and second object data stored in a second data center at a second geographical location. The processor is configured to execute the instructions to perform determining the query is for at least a portion of the first object data stored by the first data center, transmitting the query to a first computing device in the first data center, receiving results from the first computing device for the query, and providing the results in response to the received query.

Some aspects relate to systems and methods for large scale unstructured database systems, that include "offline" storage options, such as offline storage used to implement data lakes. Typically, database storage options are provided in two formats: online and offline. Online storage refers to database data kept in active memory or on executing resources that enable fast operation execution (e.g., read, write, modify, etc.) that can be on premise physical hardware or can be instantiated cloud resources. Such online data can be accessed quickly, for example, in response to queries on the database. The speed of access comes at the expense of having to supply compute resources to service any request and for example, maintain the data as readily accessible. The inventors have realized that in various approaches the need to have computer resources (e.g., cloud or physical) to support online storage consumes far too much of the system or cloud resource to justify keeping such data online.

According to some embodiments, databases and/or database services can be architected to include offline storage. The storage is referred to as offline as the data can be maintained on compute resource(s) that are not always on or available. This can include for example, external drives and/or cloud resources that can be spun up to service requests for offline data.

Some embodiments relate to a method of providing on-demand access to data hosted in an offline storage format, comprising steps of: receiving configuration data for an offline storage architecture, wherein the offline storage architecture enables dynamic schema data storage, and the configuration data comprises access information for offline data stored within the offline storage architecture; generating, based on the configuration data, a virtual collection for the offline data in the offline storage architecture; receiving a non-structured query for the offline data; and instantiating one or more compute resources to process the query using the virtual collection to generate a response to the query.

According to some examples, generating the virtual collection comprises determining partitions for the virtual collection based on the configuration data.

According to some examples, the method includes terminating the one or more compute resources responsive to completing the query.

According to some examples, the method includes instantiating one or more compute nodes comprises instantiating a plurality of compute resources, wherein each compute resource executes the query for an associated portion of the virtual collection.

Some embodiments relate to a method for integrating data stored in an offline storage format with an online database, the method comprising: storing an online database, wherein the online database is associated with one or more compute resources configured to provide online access to data stored in the online database; receiving configuration data for an offline storage architecture, wherein the offline storage architecture enables dynamic schema data storage, and the configuration data comprises access information for offline data stored within the offline storage architecture; generating, based on the configuration data, a virtual collection for the offline data in the offline storage architecture; and integrating the virtual collection with the online database to provide access to both the online database and the offline data.

According to some examples, the method further includes receiving a query, determining the query is for at least a portion of the offline data (and/or online data), and instantiating one or more compute resources to process the query using the virtual collection to generate a response to the query. For example, a coordinating agent server can coordinate execution of the portion(s) of a query for offline object data and optionally combine the results with portion(s) of the query executed for online object data.

Some embodiments relate to a non-transitory computer-readable media comprising instructions that, when executed by one or more processors on a computing device, are operable to cause the one or more processors to perform: receiving configuration data for an offline storage architecture, wherein the offline storage architecture enables dynamic schema data storage, and the configuration data comprises access information for offline data stored within the offline storage architecture; generating, based on the configuration data, a virtual collection for the offline data in the offline storage architecture; receiving a non-structured query for the offline data; and instantiating one or more compute resources to process the query using the virtual collection to generate a response to the query.

Some embodiments relate to a system comprising a memory storing instructions, and a processor configured to execute the instructions to perform: receiving configuration data for an offline storage architecture, wherein the offline storage architecture enables dynamic schema data storage, and the configuration data comprises access information for offline data stored within the offline storage architecture; generating, based on the configuration data, a virtual collection for the offline data in the offline storage architecture; receiving a non-structured query for the offline data; and instantiating one or more compute resources to process the query using the virtual collection to generate a response to the query.

BRIEF DESCRIPTION OF THE DRAWINGS

Various aspects of at least one embodiment are discussed herein with reference to the accompanying figures, which are not intended to be drawn to scale. The figures are included to provide illustration and a further understanding of the various aspects and embodiments, and are incorporated in and constitute a part of this specification, but are not intended as a definition of the limits of the invention. Where technical features in the figures, detailed description or any claim are followed by reference signs, the reference signs have been included for the sole purpose of increasing the intelligibility of the figures, detailed description, and/or claims. Accordingly, neither the reference signs nor their absence are intended to have any limiting effect on the scope of any claim elements. In the figures, each identical or nearly identical component that is illustrated in various figures is represented by a like numeral. For purposes of clarity, not every component may be labeled in every figure.

In the figures.

DETAILED DESCRIPTION

Figure 1A:
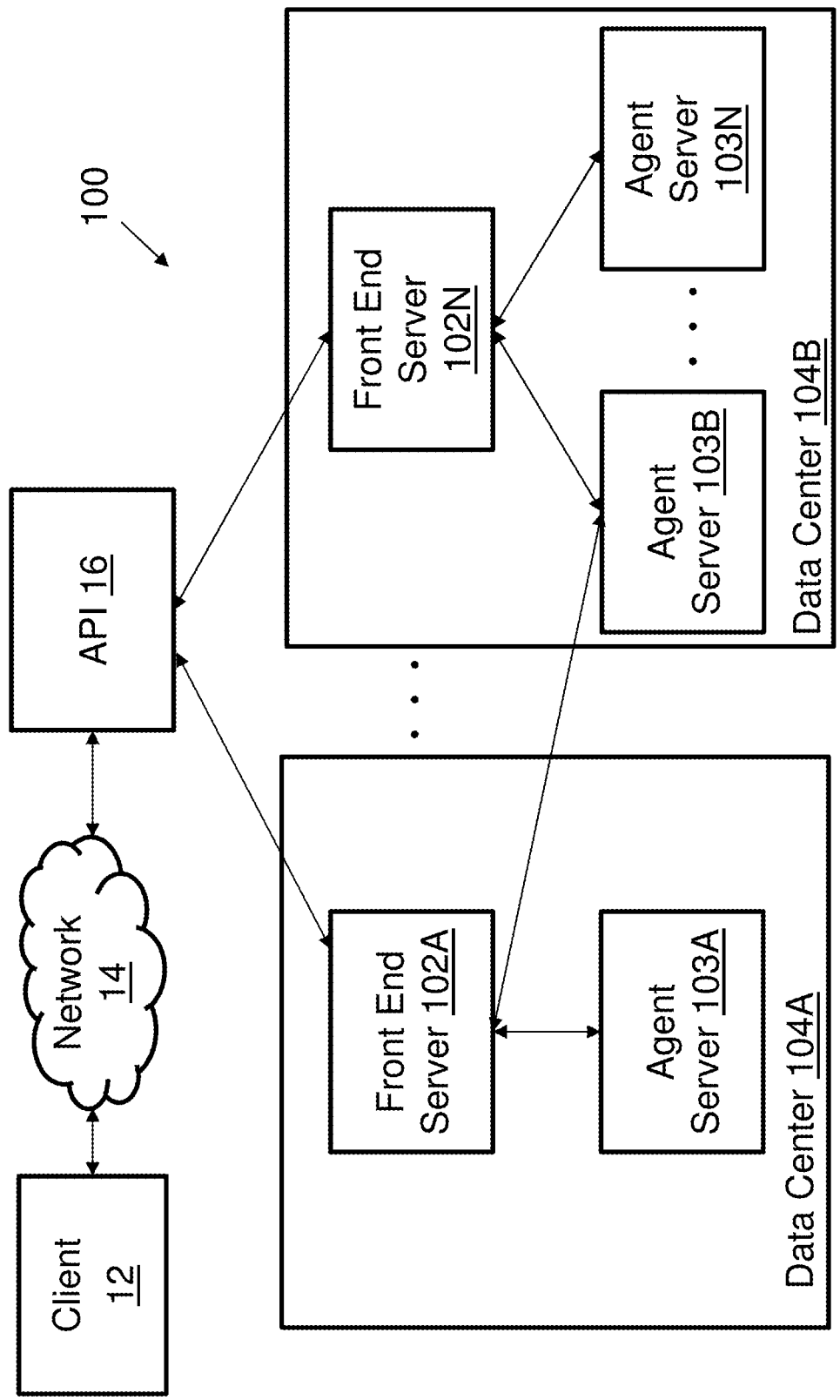
FIG. 1A is a block diagram of an example of a database system interfacing with distributed object storage, according to aspects of the invention.

According to some aspects, systems and methods are provided for fast and efficient querying of large scale unstructured database systems, such as data lakes. According to some embodiments, the techniques provide for integrating object storage into a database system that also supports online database clusters and/or other types of data stores. As a result, the techniques can provide database that use distributed object storage as a data store, and incorporate the distributed object storage database along with other types of data stores.

As the amount of digital content grows, including data stored in various formats, solutions have emerged to store such disparate digital content. For example, data lakes can be used as central repositories to store data from disparate sources in the natural format of the data (e.g., as raw files). Managed data lakes are offered by companies that provide a managed infrastructure, such as Amazon's simple storage service (S3). Other unmanaged services are also available, such as by using those provided by the Apache Hadoop ecosystem, Google Cloud, AMS, Azure, and/or the like. With the continued growth of data, companies often look to some form of data lake to dump and inexpensively store large amounts of data in random file formats.

The inventors have discovered and appreciated that the volume of data in conventional object storage can be massive, spanning hundreds of gigabytes (GB) or terabytes (TB) of data stored across thousands or millions of files. Further, such conventional object storage typically do not provide robust query functionality. Additionally, conventional approaches implementing object storage (e.g., relational databases, or static architecture databases, etc.) face a number of issues that can be exacerbated when using dynamic schema architectures. Thus, while data lake storage can be an easy solution to store disparate types of data, that ease of being able to store data in different formats can come hand-in-hand with difficulties reading the data. For example, it can be difficult to read such data because the data lake is essentially just a random collection of files sitting in storage. To address such searching difficulties, some data lake offerings can flatten the stored data into a series of tables or other data used to improve searching. However, flattening the data loses a lot of natural fidelity that can be gleaned from the original data (e.g., file hierarchies, metadata, etc.). Additionally, existing offerings often limit users to structured implementations, such as needing to use SQL (structured query language). It is desirable to therefore improve searching capabilities of data lakes, and to not limit users to structured implementations.

Other issues can include usage limitations, such as requiring the use of structured queries on structure database data (e.g., rows and columns with defined database schemas), thus these conventional systems cannot achieve the flexibility of dynamic schema architectures and preserve the integration of object storage.

It is therefore desirable to incorporate object storage into existing database systems to allow object storage to be queried separately and/or in conjunction with other types of data stores (e.g., including online database clusters, web storage, and/or the like). The inventors have developed techniques to leverage the non-structured storage techniques described herein to implement the data lake. For example, the data lake can be implemented as a database with logical organizations of subsets of database data in virtual collections. In some embodiments, the data lake is a collection of documents or other structures in object storage. Advantageously, the data lake can be implemented in a manner that does not limit the user to a structured implementation (e.g., SQL). The data lake can also be implemented in a manner that does not require flattening or otherwise modifying the data in the data lake, allowing for the full data fidelity to be maintained in the data lake.

According to some embodiments, a storage configuration file can be used to specify aspects of the object storage, such as the data stores and collections. For example, the storage configuration file can specify how files in object storage map to databases and collections, which can be presented to a user. According to some embodiments, the collections can be specified based on object names. The storage configuration file can specify the collections in a manner that provides for fast and efficient querying. According to some embodiments, the object names can be used to determine partitions of relevant data in order to limit the number of objects that need to be processed in order to satisfy a query. For example, the object names may include fields that can be searched and filtered on in order to quickly identify relevant files (and likewise to rule out irrelevant files). In some embodiments, the file names can include a format (e.g., a specified pattern, regular expression, etc.) that includes one or more data fields, such as a date stamp, a timestamp, and/or other information that can be used in the storage configuration file and/or for retrieving the files. For example, if an application that is storing data to the data lake is generating new files every hour (e.g., new data captures), the time aspect of the data creation can be reflected in the file name.

According to some embodiments, since distributed object storage can leverage multiple data centers that are geographically spread out, the techniques can process queries to identify which data centers host the data of relevance to a particular query. That query and/or portions of the query can be transmitted to computing devices within the data centers hosting the relevant data in order to execute the query in close geographical proximity to the data. As a result, large data transfers can be reduced, which can increase the query execution speed, reduce the cost to execute the query, and/or the like.

According to some embodiments, the techniques can distribute portions of a query to multiple agent servers in order to execute portions of the query in parallel. In particular, since large numbers of files may need to be read (e.g., tens of thousands of files), one factor that can limit query performance is how quickly the system can read from the underling object storage. Therefore, by coordinating execution of parts of the query across different compute nodes, multiple queries can read from the object storage simultaneously. Such techniques can provide for leveraging techniques such as MapReduce for querying the object store.

By implementing the data lake using the unstructured data storage techniques described herein, the data lake can be implemented in a manner that does not limit the user to a structured implementation (e.g., SQL), and does not require flattening the data and/or performing other data operations that reduce the data fidelity. In various embodiments, the system builds virtual collections within the object data storage (e.g., based on file naming architectures) that allow the large volumes of data to be partitioned and accessed via unstructured queries, and improve not only the data retrieval functions but preserve data structure information that can be lost in conventional approaches.

According to some aspects, systems and methods are provided for large scale unstructured database systems, that include "offline" object storage. The large scale systems can provide dynamic schema architectures, while integrating offline storage.

In various embodiments, the dynamic system with integrated offline storage includes non-structured storage techniques (e.g., virtual collections of existing data lake storage, partitions of the data lake files (e.g., generated as JSON and/or BSON files), on-demand compute resources, non-structured query support, etc.) that address such deficiencies with existing data lake techniques, and that enable use of offline data storage in conjunction with dynamic schema databases.

Examples of the methods, devices, and systems discussed herein are not limited in application to the details of construction and the arrangement of components set forth in the following description or illustrated in the accompanying drawings. The methods and systems are capable of implementation in other embodiments and of being practiced or of being carried out in various ways. Examples of specific implementations are provided herein for illustrative purposes only and are not intended to be limiting. In particular, acts, components, elements and features discussed in connection with any one or more examples are not intended to be excluded from a similar role in any other examples.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms.

Integration with Distributed Object Storage Example

According to some embodiments, the techniques provide for incorporating data stored in distributed object storage into a database system (e.g., into a database system leveraging traditional online database clusters). FIG. 1A is a block diagram of an example of a database system 100 interfacing with distributed object storage, according to aspects of the invention. The database system 100 manages database requests from client 12, which can be directed by an end user or other system. As shown, the database requests are received over one or more networks 114 by API 16. According to some embodiments, the client 12 is an application that connects to the database system that uses distributed object storage (e.g., data lake service, as described further herein) using a standard database driver for connecting to a document database. As shown in FIG. 1A, the database system 100 also includes data centers 104A through 104B (collectively referred to as data centers 104). Each data center 104 includes one or more front end servers and one or more agent servers. The database system 100 includes front end servers 102A-102N (collectively referred to as front end server 102). Front end server 102A is within data center 104A, and front end server 102N is within data center 104B. The database system 100 includes agent servers 103A, 103B through 103N, collectively referred to as agent servers 103. Agent server 103A is within data center 104A, and agent servers 103B and 103N are within data center 104B, in this example. In some embodiments, it should be appreciated that the front end servers 102 and/or agent servers 103 are in one or more data centers and/or are separate from the data centers.

Figure 2A:
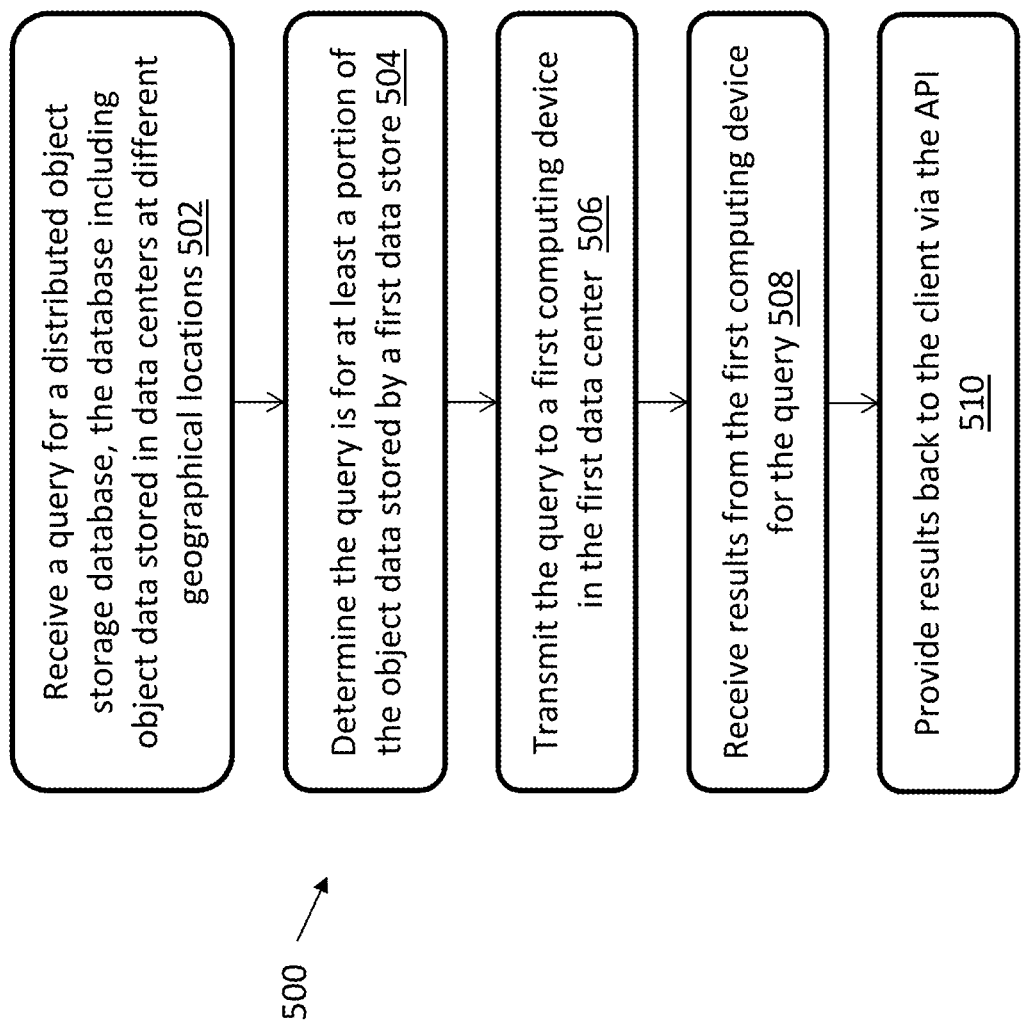
FIG. 2A illustrates an exemplary flowchart of a computerized method for querying data hosted in a distributed object storage database, according to aspects of the invention.

FIG. 1A will be described in conjunction with FIG. 2A to provide illustrative examples of the techniques described herein. FIG. 2A is a flow chart showing an exemplary computerized method 500 for querying data hosted in a distributed object storage database, according to some embodiments. At step 502, a front end server (e.g., front end server 102A) receives a query for the distributed object storage database. The distributed object storage database includes object data (e.g., objects with associated object file names) stored in multiple data centers 104 at different geographical locations. For example, first object data is stored in a first data center 104A at a first geographical location, second object data is stored in a second data center 104B at a second geographical location, and so on.

At step 504, the front end server 102A determines the query is for at least a portion of the first object data stored by the first data center 104A. At step 506, the front end server 102A transmits the query (e.g., a query plan) to the agent server 103A in the first data center 104A. At step 508, the front end server 102A receives results from agent server 103A for the query. At step 510, the front end server 102A provides the results back to the client 12 via the API 16 in response to the received query. According to some embodiments, the front end server 102A could determine a portion of the query is for data in the data center 104B, and could transmit a portion of the query to computing devices in the data center 104B (e.g., to the agent server 103B and/or agent server 103N).

According to some embodiments, the distributed object storage architecture is implemented in a distributed cloud computing environment that includes a plurality of data centers that are each in a different respective geographical locations (e.g., across a country and/or across the world). The front end server 102 generates a query execution plan and routes it to an agent server in one of the data centers 104 that coordinates query execution. Such geographical-based routing can allow the front-end server to route the query to agent server(s) in different region(s) of the country and/or world based on the query. As a result, the techniques can optimize query operations so that computations are performed as close to the data as possible. For example, performing operations as close to the data as possible can minimize the amount of data that needs to be transferred to satisfy the query, reduce the number of cost-inducing data transfer operations, and/or the like.

Query functionality of distributed object storage databases, such as data lakes, often suffer from various deficiencies as described herein since such architectures are typically not designed to serve as transactional database servers. For example, traditional database servers support create, read, update, and delete operations (e.g., allowing users to create tables in database, create rows in a table, update data in a row, etc.). However, distributed object storage typically supports limited functionality for some or all of these operations. For example, distributed object storage databases may mostly support read operations, since the databases are designed to allow customers to query data stored in one of several possible cloud servers. Therefore, distributed object storage databases allow users to query large volumes that are not writable, rather they are just readable.

According to some embodiments, the distributed object storage can be specified using a storage configuration file. The storage configuration file can provide a representation of data in data stores (e.g., cloud object stores, DBMS's, HTTP stores, and/or the like) as a set of queryable databases and collections. The storage configuration file can therefore allow users to specify collections based on sections of data in one or more data stores. For example, an S3 data store can be specified using a bucket name and a prefix to identify folders and/or files in the bucket.

As an illustrative example, assume there is an S3 bucket "mybucket" that has the folders "foo/bar" and the object or file "file1.jsn." This full path in S3 to file1.json can be: "s3://mybucket/foo/bar/file1.json" (e.g., which can be used as an object name). According to some embodiments, the storage configuration file can specify data stores that link back to the underlying object data. Collections and databases of object storage can be specified in the storage configuration file with datastores that link back to the stores mentioned above (e.g., cloud object stores, DBMS's, HTTP stores). According to some embodiments, stores can be considered identifiers for the underlying storage layer. The intelligence of how to interpret the data of a store can be contained in a data sources section of the storage configuration file. According to some embodiments, the data sources section of the storage configuration file can be specified within the collection (e.g., which can be specified within the database).

According to some embodiments, the storage configuration file specifies the data stores and the collections. The system 100 (e.g., the front end server 102) can access the storage configuration file to configure the data stores and collections. For example, the storage configuration file can specify a first data store comprising the first object data stored in data center 104A and a second data store comprising the second object data stored in the data center 104B. The storage configuration file can also specify a collection that includes a subset of data from the first data store, a subset of data from the second data store, or both. As a result, a collection can reference multiple data stores and can pull some and/or all of the data from the data stores.

According to some embodiments, the storage configuration file can be used to provide permissions for access to the object data. For example, the database system can configure permissions for databases and/or collections specified by the storage configuration file.

According to some embodiments, the storage configuration file can allow the system to use wildcard name segments to easily specify/identify distinct collections. Therefore, rather than needing to explicitly name all of the folders and files of a collection, a wildcard name segment can specify a portion of an object or file name that can be matched to quickly and easily identify a particular collection. For example, as described herein, data stores include objects that have associated object names (e.g., where the object name is a full path to a file). In some embodiments, the storage configuration file can specify which portions of the object name should be interpreted as the name of the collection.

According to some embodiments, the storage configuration file can specify a collection using a keyword that includes a set of field values that are used to match to the object names to identify the objects for/in a collection. An example is provided below of a wildcard used to specify the collection name in database test:

```
{"databases": [
{"name": "test",
"collections": [
    {"name": "*",
    "dataSources": [
        {"storeName": "datastore1",
        "path":
"{collectionName( )}/{year int:\\d{4}}{month int:
        \\d{2}}{day int:\\d{2}}_*"}
    ]}
]}
]}
```

Assuming a date of Dec. 15, 2017 is used and the collection name is "Price," this example identifies files in an object store named datastore1 with the following file name format: Price/20071215_*, where * is used to indicate anything that follows in the file name (e.g., such that Price/20071215_test1.json and Price/20071215_test2.json would both be added to the P rice collection, and tagged in a partition containing data for Dec. 15, 2017. Queries from the Price collection for dates other than Dec. 15 2017 will not require the system to read these files. Similarly files in datastore1 with the file name format Orders/20071101_* would be associated with the Orders collection, and tagged in a partition containing data for Nov. 1, 2007.

As another example, assume there are twenty collections in the object storage. Instead of requiring a user to type out all twenty collections (e.g., which would require typing twenty lines), the user can instead use a wildcard name segment. Assume, for example, the object storage includes files in the following paths:

/sampleData/orders/01/files . . . , /sampleData/orders/02/files . . . , etc.

/sampleData/inventory/01/files . . . , /sampleData/inventory/02/files . . . etc.

A user may wish to specify a collection that includes all of the files in such paths. In order to do so, a user can simply provide prefix (e.g., /sampleData/{collectionName( )}/) as a wildcard to add all files under the prefix to the orders and inventory collections respectively.

As a further example, assume the object storage has files in paths that span from 01 to 52 (e.g., /sampleData/orders/01/files . . . , /sampleData/orders/02/files, through /sampleData/orders/02/files . . . ). A wildcard can be used to match all fifty-two paths using, for example, /sampleData/{collectionName( )}/{week int:\\d{2}}/*.

The storage configuration file can provide a flexible mapping of data, including combining individual objects, files and/or collections into (virtual) collections. According to some embodiments, the storage configuration file can be used to specify collections of objects or files with various formats. For example, a collection can include multiple file formats, such as JSON, BSON, compressed JSON, compressed BSON, Parquet, AVRO, ORC, CSV, and/or other file formats.

According to some embodiments, the storage configuration file can allow for different types of storage, such as both online and object stores, to be specified and queried separately and/or together. For example, data stores can be configured to include data from distributed object storage, an online database cluster, a Hypertext Transfer Protocol (HTTP) store, and/or other stores. For example, the storage configuration file can specify a data store that includes data from an online database cluster and/or a data store that includes data from an HTTP store. The storage configuration file can specify a collection that includes data from the various types of storage, including the object store, the online database cluster, and/or the HTTP store.

Referring to step 502, a front end server 102 (e.g., front end server 102A) receives a query for the distributed object storage database. According to some embodiments, query execution can be optimized to occur in agents and/or servers that are geographically close to object storage that will be processed to satisfy a particular query. Referring to FIG. 1A, the API 16 processes the request and routes the request to a front end server 102. According to some embodiments, client connections can be routed to a frontend server 102 that is geographically close to the client 12's location (e.g., using load balancing mechanisms that are known to those skilled in the art). As described further below in conjunction with step 506, the geographical optimization can additionally or alternatively be used with the agent servers that execute the query.

According to some embodiments, the system can support an execution architecture that allows aspects of the query to be split into stages, some of which can be executed concurrently and in parallel, and results from stages can be combined to be routed to further processing stages. In some embodiments, queries of the distributed storage architecture can be expressed using an aggregation pipeline architecture (e.g., using MongoDB's aggregation pipeline language). The aggregation pipeline language allows users to express queries in a sequence of stages using operators. The data (e.g., in an object store, a database cluster, HTTP store, and/or the like) can be processed sequentially, such that the results of each processing stage form the input to the next processing stage, and so on. The final results are returned by the last processing stage.

According to some embodiments, as the front end server 102 parses the query, the front end server 102 can convert it into an Abstract Syntax Tree (AST), which represents the query in a format that is easily manipulated for query planning. The planner (e.g., which may be part of the front end server 102 and/or a different computing component) generates a plan tree that is then passed to agent server(s) for execution as discussed herein.

According to some embodiments, the front end server 102 can perform plan stage reordering. In some embodiments, the front end server 102 may move pipeline stages such as filtering stages earlier or later in the execution pipeline. For example, the front end server 102 can push a $match stage (which searches for objects or documents that match specified criteria) down so that the $match stage executes earlier in the pipeline and allows documents to be filtered early in the pipeline. This can reduce the amount of processing that needs to be done as the data moves through the pipeline, and/or can be combined with partitions to further reduce the amount of data that needs to be read to satisfy a query. Reducing the amount of data processed early in the pipeline can be particularly useful when querying object data because the volume of data is large, and the object store itself typically does not provide fast access, and therefore any reduction in the volume of data that needs to be read results in a noticeable cost savings and performance improvement.

According to some embodiments, the front end server 102 can perform plan stage compression. In some embodiments, the front end server 102 may combine multiple operations to perform compression, such as by combining multiple of the same and/or different operations. For example, an $addFields stage (which adds some new fields to documents) followed by another $addFields stage (which adds different fields to documents) can be compressed into one $addFields stage. This allows the documents passing through the pipeline to be processed once (for this part of the pipeline). Performing such compression can reduce processing cost compared to executing separate operations.

Figure 1B:
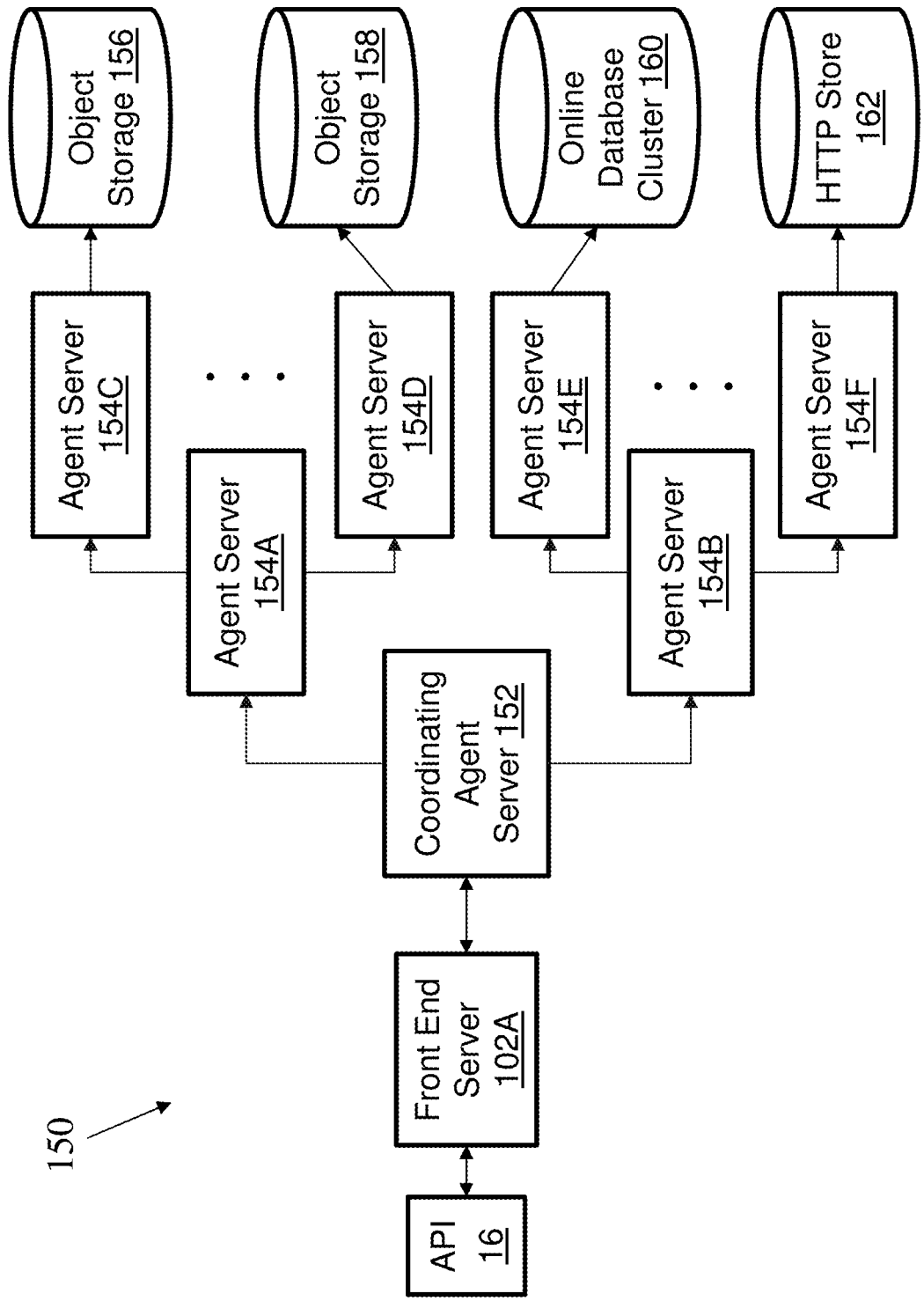
FIG. 1B is a block diagram of an example of a database system interfacing with distributed object storage and other databases, according to aspects of the invention.

According to some embodiments, the front end server 102 can insert new plan stages for example to enable parallel execution or to allow several operations to be performed during stage execution to improve efficiency, as discussed further herein in conjunction with FIG. 1B. For example, the front end server 102 can break pipelines up into plan stages that allow parallel reads from the object store (e.g., and are partially executed using a map-reduce algorithm, as discussed further herein).

According to some embodiments, the front end server 102 parses queries from users and can perform query planning steps including rewriting and/or optimization to improve performance, including identifying partitions. As described herein, the storage configuration file utilizes computer language constructs to specify the data stores, such that each object in a data store has an associated object name. According to some embodiments, the system 100 can use the storage configuration file syntax to identify partitions to optimize queries. According to some embodiments, a partition can be determined and/or specified based on a value of a field, a range of values of a field in the object names (e.g., a range of a date field, time field, and/or the like), a combination of fields, and/or the like. For example, some embodiments can specify a range as a minimum and maximum of a field, such as a minimum and a maximum of a date and time field.

As an example, a partition can be specified as:
folder1/price/price:{min(asOfDateTime) isodate}_{max(asOfDateTime) isodate}

The exemplary partition specification above identifies files in an object store with the following file name format: folder1/price/price:2017-03-06T00:35:50+00:00_2017-03-06T18:17:00+00:00.json will be tagged with partition information such that queries that match documents with field asOfDateTime values that are between ISODATE 2017-03-06T00:35:50+00:00 and ISODATE 2017-03-06T18:17:00+00:00 will be read from the designated file. As a result of this approach, if a query selects or filters documents with an asOfDateTime field in this range, n, the partition specification provides information allowing agent servers to filter or prune the data that is read such that the portion of the query can be executed using this particular partition file, is not necessary for agent servers to read other files to satisfy the query. Therefore, the use of partitions can (e.g., significantly) reduce the amount of data that needs to be scanned for a query. For example, if a user is searching for a record/document that falls on a specific time, the system can look at just the file names and not open the files to determine ultimately what files to open (and likewise which files not to open). As a result, the techniques can be used to quickly filter based on a field; there could be TBs of data, but only a small portion may actually be read by limiting the query only to matching files.

Referring to step 504, the front end server 102 determines the query is for at least a portion of the first object data stored by the first data center 104A. According to some embodiments, the distributed object storage is a multi-tenant service that allows multiple users (e.g., multiple companies and/or users within companies) to store data in the distributed object storage. The system 100 can be configured, for each connection, to identify a tenant (e.g., a database user) and/or authorized users. As a result, the distributed object store can have users associated with hundreds of tenants that can be executing queries simultaneously. Thus, according to some embodiments, for each connection the front end server 102 identifies a tenant in the case of a multi-tenant service. The front end server 102 authenticates a user (of the client 12) associated with the tenant, and establishes permissions for operations the user can perform associated with specific data. The front end server 102 can authorize or reject a query based on access and/or the permissions of the tenant.

Referring to step 506, the front end server 102 transmits the query (e.g., a query plan) to a first computing device (e.g., a coordinating agent server, such as 152 shown in FIG. 1B) in the first data center 104A. According to some embodiments, front end server 102 processes the query plan to determine where the object data associated with the query is stored (e.g., object storage in a data center in a certain geographical location). For example, the front end server 102 can be located in the United States, and can determine that the data needed to execute the query is stored in a data center in Ireland. The front end server can send the query execution plan to a coordinating agent server in the data center in Ireland to coordinate execution of the query plan locally to the object data. As a result, the query plan can be executed in geographical proximity to the relevant data. Such techniques can significantly reduce the amount of object data transferred to process the query. If, for example, the query is to count documents in the data center, all that is returned from the agent server in the data center in Ireland in response to the query can be a count (e.g., rather than executing the query in the United States, which would require transferring all of the object data to the United States). Therefore, the agent server in the Ireland data center may read a terabyte of data, and just return a small count (e.g., 64 bytes). Such techniques can improve the speed/efficiency at which such a query can be executed, decrease the cost required to execute the query, and/or the like.

According to some embodiments, the coordinating agent server can distribute portions of the query among a group of agent servers to perform reads from object storage concurrently and/or in parallel in order to reduce latency (e.g., compared to sequentially performing the reads). Parallel processing can be used, for example, when a query needs to read large numbers of files (e.g., tens of hundreds or thousands of files). The parallel processing can farm out parts of the query execution to different processing devices to essentially result in multiple queries that are all reading from the object storage simultaneously.

Referring to FIG. 1A, there can be one or more agent servers in a data center 104. According to some embodiments, a coordinating agent server receives the query execution plan from a front end server 102. The coordinating agent server can expand the query execution plan to enable distributed query execution by one or more additional agent servers. FIG. 1B is a block diagram of an example of a database system 150 interfacing with distributed object storage and other databases, according to aspects of the invention. As shown in FIG. 1B, the coordinating agent server 152 distributes portions of the query execution plan to one or more non-coordinating agent servers in an execution tree, starting with agent servers 154A through 154B. In the example shown in FIG. 1B, agent server 154A in-turn distributes portions of the query execution plan to agent servers 154C-154D, and agent server 154B distributes portions of the query execution plan to agent servers 154E-154F. Collectively, agent servers 154A-154F are referred to as agent servers 154. It should be appreciated that the number of agent servers and levels shown in FIG. 1B is for exemplary purposes only. The number of non-coordinating agent servers, levels in the execution tree, or both, may depend on various factors, such as the number of files that need to be read from object storage. Using a plurality of agent servers can allow for parallel and concurrent reading of object store data and partial execution of the query.

In some embodiments, the coordinating agent server 152 can receive partial results from one or more non-coordinating agent servers 154 and compile the partial results to generate final results. The coordinating agent server 154 returns results to the front end server 102. According to some embodiments, a MapReduce-like algorithm and/or other techniques can be used to execute the query (e.g., in addition to parallelizing portions of the query). MapReduce techniques can allow pieces of the query to be executed at each level of the agent server tree shown in FIG. 1B and combined to generate results that are passed up to the next level of the tree. For example, if a user submits a query to count all of the documents that have a particular field in the object name, each leaf agent server 154C, 154D, 154E and 154F counts however many hits are in the set of objects being searched by the agent server, and passes it's provisional count up to the next higher node, which sums counts from lower level nodes. The techniques can include reducing the results at each succeeding node until the results are passed to the coordinating agent server 152 (top leaf), which sums the counts from the two nodes below and returns them back to front end server 102A. As a result, the techniques can leverage parallel reads and/or distributing query execution to process large amounts of data stored in object storage with resulting performance improvements.

In some embodiments, an AST tree as described herein can allow execution of techniques such as MapReduce. For example, if a query counts all documents in a collection, this can be broken into multiple readers, each of which then passes data to a counter. The partial results from the counters can then be sent to a stage that sums all of the counts. Such an approach can be executed recursively, so that there is an execution tree. For example, the execution tree can include a first level of readers, a second level of counters (e.g., the map stage) that receives results from the first level of readers, a third level of summers (e.g., the reduce stage) that receives results from the second level of counters, and a fourth and final summer (e.g., the final reduce stage) that receives results from the third level of summers.

In some embodiments, in addition to reading data from object stores, agent servers can query data from one or more online database systems, and merge the results with results from object data. Referring further to FIG. 1B, for example, the agent servers 154 can communicate with a first distributed object storage 156 and a second distributed object storage 158 (e.g., where the distributed object storages 156, 158 are different regions). Additionally, the agent servers 154 can communicate with an active or online portion of a database system or cluster 160. The online database cluster 160 can be a dynamic schema database system such as the well-known MONGODB database platform. An exemplary embodiment of an implementation for the API 16, including an online database engine and online storage, is discussed further in conjunction with FIGS. 3-6.

As described herein, the system can support different storage tiers, such as online database clusters, object storage, HTTP stores, and/or the like. An HTTP store can be an HTTP URL against which requests can be made to retrieve documents. According to some embodiments, the techniques can be configured to provide queries to a plurality of different data stores. For example, the coordinating agent server 154 can determine a query needs to be run on both object storage 156 and the online database cluster 160. The coordinating agent server 152 can distribute a first portion of the query to the agent server 154C in the data center to query the object storage 156. The coordinating agent server 152 can also distribute a second portion of the query to the agent server 154E to query the online database cluster 160 (e.g., which may be in the same and/or a different data center). As another example, the coordinating agent server 154 can determine a query needs to be run on both object storage 156 and the HTTP store 162. The coordinating agent server 152 can distribute a first portion of the query to the agent server 154C in the data center to query the object storage 156 and a second portion of the query to the agent server 154F (e.g., which may be in the same and/or a different data center) to query the HTTP store 162.

According to some embodiments, allowing multiple and/or different types of data stores to be read from in addition to object storage can provide various features not otherwise available for distributed object storage. For example, the system can read from multiple database clusters and perform a cross-database join operation between the multiple different databases on different clusters. As another example, the system can execute a query against both archival data in an object store and an online database cluster, which can reduce costs by allowing users to move historical data out of an online cluster and into object storage without losing the ability to query the data.

Referring to step 510, the front end server 102 provides the results back to the client 12 via the API 16 in response to the received query. According to some embodiments, the front end server 102 receives query execution results from the agent server, optionally buffers results received from the agent server, and returns the results to the client.

According to some embodiments, a function (e.g., the $out function in MONGODB) can be used to write the results of a query to a file (e.g., a file in S3), a collection in an online database, and/or the like. Such a function can be used, for example, to generate (e.g., persist) data for a reporting application, to execute a complex query one time and store the results, and/or for other applications that require writing out the results of the query. As a further example, if a user is archiving data to the distributed object storage, the function can be used to move the archived data back into an operational database.

According to some embodiments, an archive feature can be provided so that distributed object storage can be used to archive the data in online database clusters and/or other databases such that users can query the archived data. For example, the system can automatically archive data in the online database cluster 160 into distributed object storage (e.g., into object storage 156 and/or 158). As described herein, the techniques can include making a unified view, such as a read-only view, of the data in the distributed object storage and online database(s). As described herein, according to some implementations data may be stored across machines in a database cluster. The archive feature can be provided at a cluster-level, such that data from different clusters, including one or more databases and/or collections on such clusters, can be selectively archived using the distributed object storage.

Some embodiments can include providing one or more archive configurations for each database collection. Each archive configuration can include a namespace (e.g., the database name and/or collection(s)) and a set of archiving rules. For each archive rule, various aspects can be specified, such as a date field and number of days (X). The archiving rules can be implemented such that once the current date becomes greater than the date field value+number of days (X), the document(s) associated with the namespace can be archived to the distributed object storage.

According to some embodiments, an archive rule can specify a set of one or more partitions (e.g., two partitioning fields) in addition to the archiving date. The partitions can be specified based on different fields, such as based on one or more fields from each document, such as a date field. According to some embodiments, the partition fields can be truncated when associated with numeric values. For example, data partitions based on the date field from a document can be truncated to the day (e.g., even if the date field includes more granular information, such as hours, minutes, seconds, etc.). Truncating the partition fields can be beneficial, for example, to provide for better document groupings into files. The archive structure in the distributed object storage can be specified based on the partition field(s), such as having an archive structure of: <mdb s3 bucket>/<project-id>/<cluster-unique-id>/<db name>/<collection uuid>[/partition field1] [/partition field2].

According to some embodiments, an archive can be in one of a set of states. The set of states can include an active state, a paused state, and a deleted state. When an archive is paused, the data previously archived can be maintained in the distributed object storage, but further data or changes are not archived. When an archive is deleted, the data in the distributed object storage can be removed (e.g., automatically and/or after a predetermined period of time, such as a number of days).

According to some embodiments, for an archive namespace, the set of archives can be constrained. For example, multiple archives can exist for a namespace but only a single of those archives can be in an active state (e.g., while the others are in a paused and/or deleted state). Such constraints can be used, for example, to support migrating data to change the partition structure of the database. For example, a collection can be dumped, the archive for that collection can be deleted, and the collection can be restored back to the cluster. The archives can show the date range of any stored data to facilitate the restore process. If an archive is disabled, one or more warnings can be provided to indicate that the archived data may be out of date.

According to some embodiments, constraints can be imposed based on a namespace and partitioning field. For example, multiple active archives on the same collection with the same partitioning fields can be disallowed. This can be done, for example, since the collection and partitioning field can be used as a unique identifier to determine the names of the data files that are associated with a certain archive.

Archives may allow some fields to be edited, while preventing other fields from being edited. For example, the number of days upon which to archive a document of an existing archive can be modified. As another example, other fields, such as the namespace, date field, and/or partitioning field(s) may be static and not editable.

Online and Offline Data Storage Example

Figure 1C:
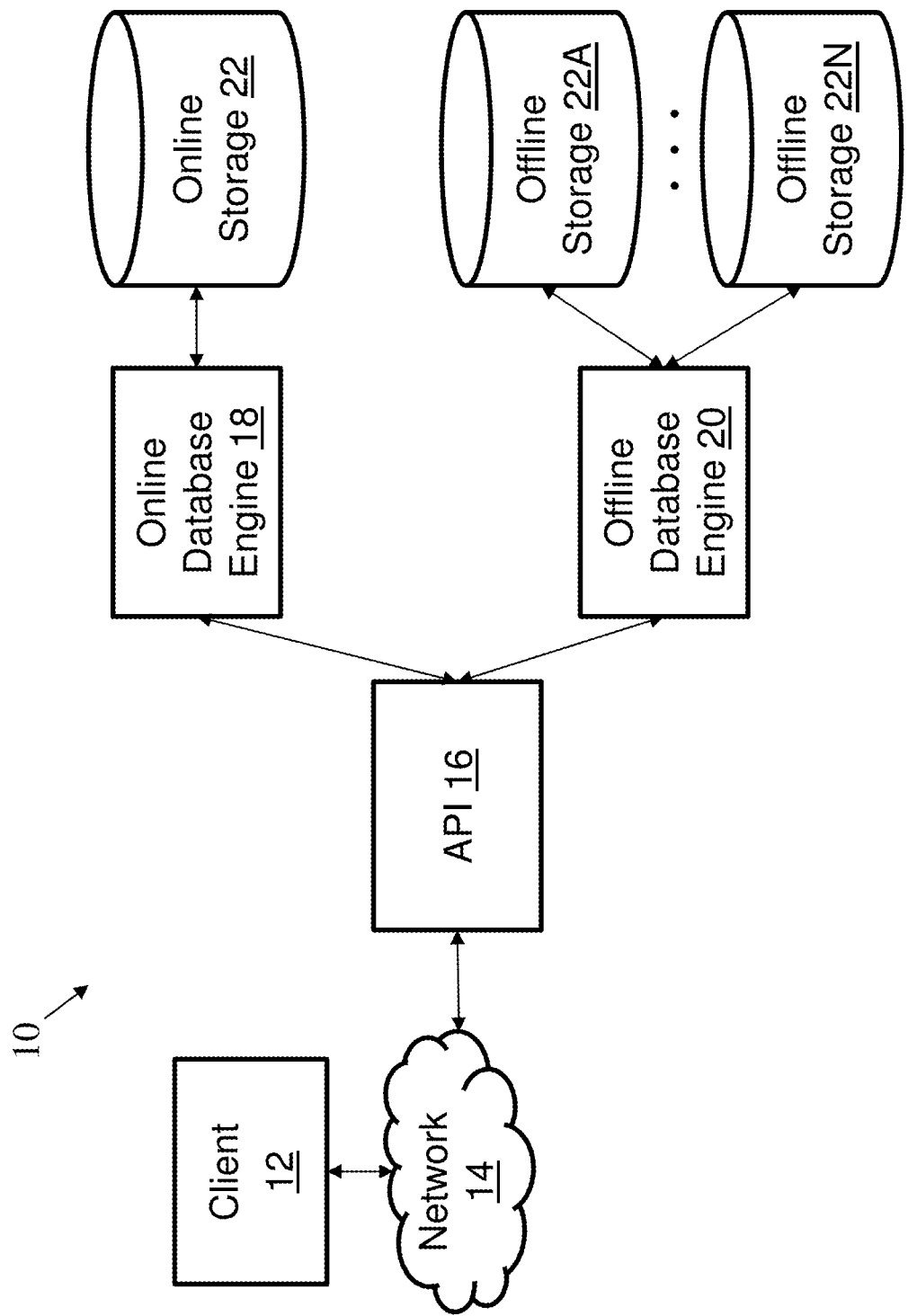
FIG. 1C is a block diagram of an example offline and online database system, according to aspects of the invention.

FIG. 1C is a block diagram of an example online and offline database system 10, according to some embodiments. The system 10 manages databases requests from client 12, which can be directed by an end user or other system. As shown, the database requests are received over one or more networks 114 by API 16. The API 16 processes the request and determines whether to route the request to the online database engine 18 and/or the offline database engine 20. The online database engine 18 interfaces with an active or online portion 22 of the database system. The online portion 22 can be a dynamic schema database system such as the well-known MONGODB database platform. An exemplary embodiment of an implementation for the API 16, online database engine 18 and online storage 22 for the online portion of the system 10 is discussed further in conjunction with FIGS. 3-6.

In various embodiments, clients and/or end users can identify data for storage in system 10 as an offline format, shown as offline storage 24A through 24N (collectively referred to as offline storage 24). In some examples, the system will capture information from the client or end user via prompts, as described further herein. The data capture can include information on the data format, how often data retrieval is expected to be requested, data structure for data lake data (e.g., bucket or directory information for the data lake), any existing format conventions, naming conventions, etc.

The system can be configured to integrate offline data storage formats based on existing formats and naming conventions, and/or utilizing information provided by the end user or client.

In one example, the dynamic schema database system can include an offline storage engine 20 (discussed in greater detail below) that is configured to manage access and retrieval of data stored in offline storage 22. While FIG. 1C shows the online database engine 18 and the offline database engine 20 as separate components, in some embodiments a combined online and offline database engine can be used to process request for data stored in both online and offline formats. In some embodiments, the offline storage engine 20 is configured to build virtual collections within the offline data, generate one or more partitions of the offline data, and facilitate retrieval and/or query operations of both online and offline storage. For example, the offline database engine 20 can be configured to convert a received request to fetch data from the offline storage 22 (e.g., such as S3).

Offline Data Integration Example

According to some embodiments, the object store may include online and/or offline storage. In some embodiments, the front end server can route a query to an agent server (e.g., within a data center) that may need to access offline and/or online storage. The agent server can coordinate execution by querying both offline storage as well as online storage, as necessary. For example, a coordinating agent server can coordinate queries of both offline and online storage and combine the results.

In some embodiments, the techniques can create one or more partitions (e.g., as described herein) for the data files in the data lake. As described herein, a partition can be created based on information in the file names, the directory structure(s), buckets, and/or the like. In some embodiments, the partitions can be one dimensional, such that the partition is based on just one aspect, such as buckets. In some embodiments, the partition can be multi-dimensional, such that the partition is based on multiple aspects, such as buckets, data in the file name, and/or the like.

In some embodiments, the database system can create a set of one or more files, such as JSON (JavaScript Object Notation) files or BSON (binary encoded serialization of JSON), to partition the data. In some implementations, any data within the database can be organized into documents. Some examples of document organization formats include the known JSON and BSON formatting for documents. BSON is a binary format in which zero or more key/value pairs are stored as a single entity. The BSON entity can be referred to as a document. In some examples, BSON adds some additional information to documents, like length prefixes, that make it the document easier and faster to traverse. BSON is also designed to be fast to encode and decode. For example, integers are stored as 32 (or 64) bit integers, so they don't need to be parsed to and from text. This uses more space than JSON for small integers, but may be much faster to parse. The choice between JSON and BSON may therefore be made according to traversal needs, storage efficiency, or other considerations.

Information about files in the data lake, including user-specified information (e.g., buckets/directories, metadata, etc.) and/or information that can be gleaned from the data lake (e.g., information included in the directory structure, files and/or file names) can be used to build an partition specification for the offline storage. The partition specification can be built by organizing the data into a series of JSON files or BSON files as described herein. While JSON and BSON are given as examples, it should be appreciated that multiple file types are supported, such as CSV, Parquet, Avro, and/or other file types. The partition can include information that is inherited from the files, such as from the file names, as discussed herein. The database system can use the partitions to improve a data lake query. For example, if the query includes a data aspect used to build the partition(s) (e.g., a date or time field of a virtual collection that is inherited from the file names), the database engine can leverage such information in the partition (e.g., time-based partitioning) to go to the desired file.

In some embodiments, the data lake can be implemented using a serverless architecture. For example, rather than using dedicated resources and/or resources that are always running, the data lake can be implemented using virtual resources that can be instantiated when a read request is issued for an associated data lake. In some embodiments, the data of the data lake is decoupled from the compute resources (e.g., memory resources, processing resources) that are spun-up to access the data. Decoupling the compute resources from the data lake storage can, for example, save costs, since some pricing models may not charge for data that is not consuming active resources. Therefore, users can avoid needing to pay for the data to be hosted in real-time (e.g., which typically requires memory storage and compute resources to be on all the time). When query comes in, the database can spin-up a serverless compute node or nodes that execute a query, and then terminate once done servicing the query. Therefore, instead of a per-hour fee often required to keep data on and available all the time, a user can be charged only for each data lake request and the increment of time/resource used to respond to the query. For example, the fee structure can be based on a cost to spin-up a serverless compute node. As another example, the fee structure can be based on the data processed for the request, such as how much data is scanned for the query, how much data is returned for the query, and/or the like.

In some embodiments, the techniques can provide a multi-tenant compute tier that can be used by multiple users. The multi-tenant compute tier can include a swarm of compute nodes that handles queries, including determining how to process the particular query. For example, the query service nodes can divide and conquer a query by processing data from the files within the customer's S3 buckets. The results of the query service nodes can be merged to create a result set. The result set can be returned to the user in response to the user's query.

In some embodiments, a query may require retrieving data from stores in more than one region (e.g., in more than one region of a cloud provider). Such a query can be processed to segment the query by region, and route segments of the query to processing resources in the same region as the store containing the data. The techniques can combine results from multiple regions to generate a final response that is returned to the requesting device.

Figure 2B:
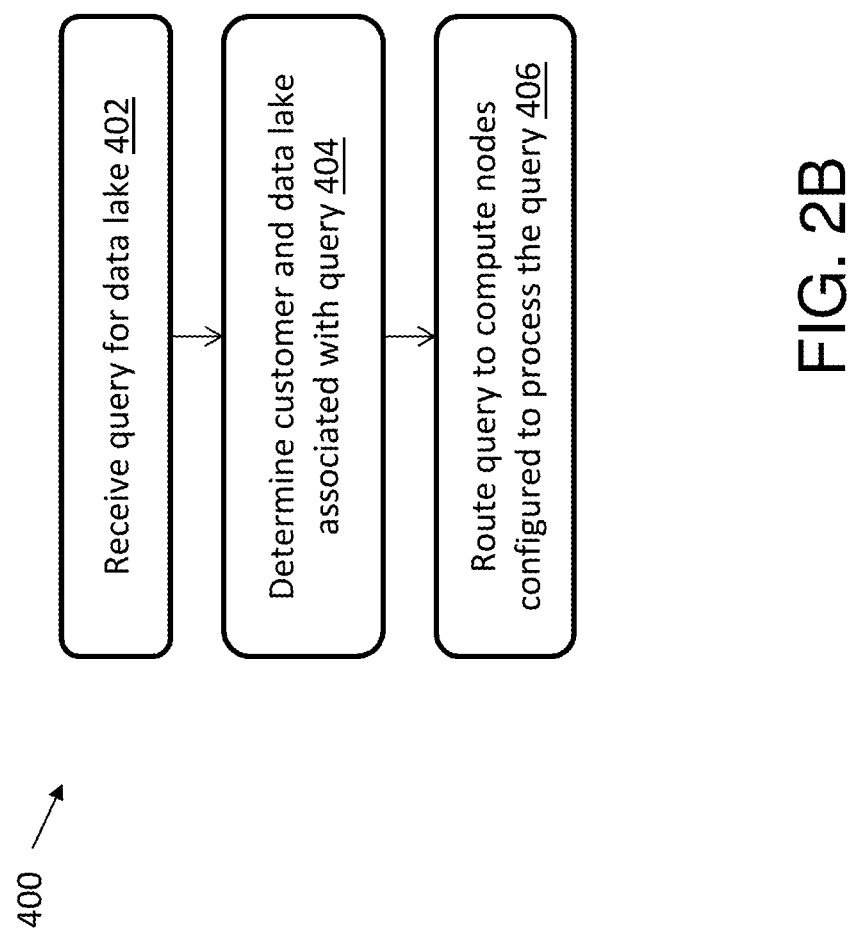
FIG. 2B illustrates an exemplary flowchart of a computerized method for processing a query for an offline data lake, according to aspects of the invention.

FIG. 2 is an exemplary flowchart of a computerized method for processing a query for a data lake, according to some embodiments. At step 402, the multi-tenant compute tier receives a query for a data lake. At step 404, the multi-tenant compute tier determines which user is querying which data lake. At step 406, the multi-tenant compute tier routes the query to compute nodes that are configured to search for and/or pull the data from the data lake. If the query service determines that multiple files within the data lake buckets need to be scanned, then multiple query service nodes can be used to scan the different files in parallel. In some embodiments, the techniques can be configured to route queries among different regions (e.g., based on the URI for supported services and/or regions).

As an illustrative example, a query comes in from a user to a query service node. The query service node determines the type of query is a data lake query, and determines the virtual collection for the data lake. For example, a query may include a collection name and database name, which the multi-tenant compute tier can use to determine the associated virtual collection. The virtual collection can be mapped to associated buckets using a hostname. For example, the various query services supported by the database system can each include a separate hostname that the clients use to connect to (e.g., to run queries). Each hostname can be associated with its own set of configured mappings, including mappings to the data lake buckets. The query service node determines whether the query can be divided and processed by multiple query service nodes. If the query can be divided, the query service node spreads the work across multiple query service nodes. The result(s) from each of the query service node(s) are aggregated to provide a set of results in response to the user's query.

In some embodiments, other database products (e.g., fully online databases, etc.) can be provided in combination with an on-demand data lake. For example, a cohesive environment can be created between the online databases and the data lake. In some embodiments, in a combined environment, the system can be configured to automatically move data to an offline data lake (e.g., for cost reasons, performance reasons, etc.). For example, the database system can be configured to move the data to the data lake if the data hasn't been accessed for a predetermined time period, such as two weeks, thirty days, and/or the like. In some embodiments, the database system can be configured to execute queries that span both online storage as well as offline data lakes.

In some embodiments, the data engine can be configured to write out the resulting data in response to the query. In some embodiments, tools separate from the data engine can be used to output the data. The data can be written out to as a collection of the one or more files that are responsive to the query. For example, the data can be written back into another database supported by the database system. In some embodiments, the database can be a database cluster, another data lake, and/or the like. For example, a user can give the database system write access to the user's data lake (e.g., S3 storage), such that the database system has permissions to write the results to the user's data lake. The data can be written out using a standard file format, such as JSON, BSON, etc., as discussed herein.

The data lake techniques described herein can be used to enhance large scale data storage and access applications. For example, the data lakes can be used to store periodic data captures, such as data captures used for reporting and/or analytics. As another example, the data lake techniques can be used by data repositories or data brokers that store data for sale to users. The data lake can allow a data broker to run queries for data they want, without needing to pay to maintain the data online.

Online Example

Figure 3:
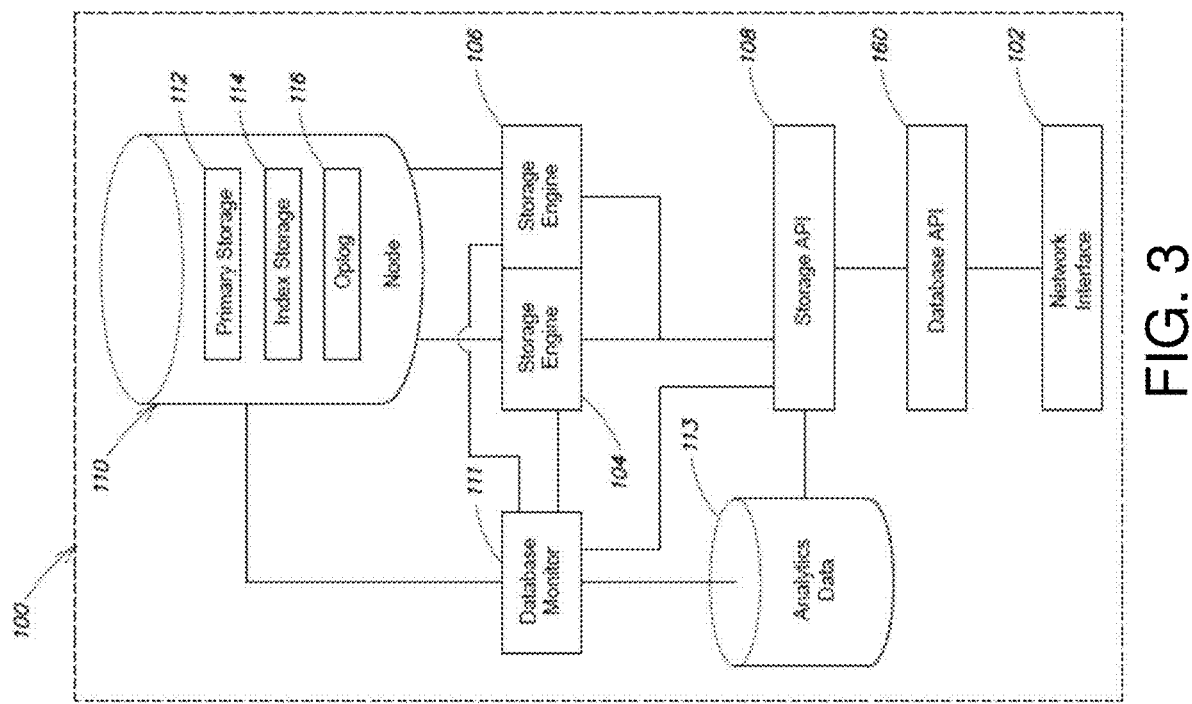
FIG. 3 illustrates a block diagram of an example architecture for a database server, according to aspects of the invention.

An example of an implementation for an online portion of the database system discussed in conjunction with FIGS. 1B-1C is shown as database subsystem 100 in FIG. 3. The database subsystem 100 includes an interface 102 for sending and receiving information (including database requests and responses thereto) to router processes, database clients, or other components or entities in the system. In one embodiment, the backend architecture is configured to interact with any data model provided by a managed database. For example, the managed database can include a non-relational data model. In another embodiment, the data model can be implemented in the form of replica sets as described in U.S. patent application Ser. No. 12/977,563, which is hereby incorporated by reference in its entirety. The database subsystem 100 includes a storage application. In one implementation described in greater detail below, a base unit of data is a document.

Database subsystem 100 includes an application programming interface (API) 108 that receives database requests, including requests to perform read and write operations. When a write operation is requested, the storage API 108 in response selectively triggers a first storage engine 104 or a second storage engine 106 configured to store data in a first data format or second data format, respectively, in node 110. As discussed in more detail below, a database monitor 111 may track a number of analytics about the database. In some embodiments, the database monitor 111 is configured to track the operations performed on the data over time, and stores that information as analytics data 113. In some examples, analytic data may be stored in a separate database. In other examples, the analytics data is stored as a name collection (i.e., a logical grouping of data). These analytics may be provided to the storage API 108, which relies on the analytics to selectively actuate an appropriate storage engine.

In one example, the database monitor 111 tracks the relative number of read and write operations performed on a collection within the database. In another example, the database monitor 111 is configured to track any operations (e.g., reads, writes, etc.) performed on any base unit of data in the database.

In some embodiments, the storage API 108 uses the tracked data (e.g., analytics data) collected by the database monitor 111 and/or the analytics data 113 to select an optimal storage engine and/or data format for a database, a collection, or a document having the observed read/write ratio. In one example, the storage API 108 is mapped to the selected storage engine. For example, an identifier of the selected storage engine may be stored in a location in memory or on disk; when a write operation request is received by the storage API 108, the identifier is used to identify and activate the storage engine. Alternatively, elements of the database can specify a mapping or association with a storage engine that can be manually edited, edited through an administrative interface, or automatically changed responsive to system monitoring. In other embodiments, the database monitor 111 itself is configured to determine an optimal storage engine based on the analytics data 113 and other aspects of the data, for example, stored in the database, database collection, or in a document. This determination may be passed to the storage API 108, or otherwise used to map the storage API 108 to a determined storage engine. Additionally, the storage engine can be configured to evaluate data for storage in an offline format. In some examples, the storage engine analysis is used to generate recommendations to clients/end users of the database system on implementing offline storage. In other examples, the system can generate a new storage architecture to include offline storage, and provide information to the client/end user on the changes and efficiencies achieved in the new format (e.g., less resource consumption, etc.).

Figure 4:
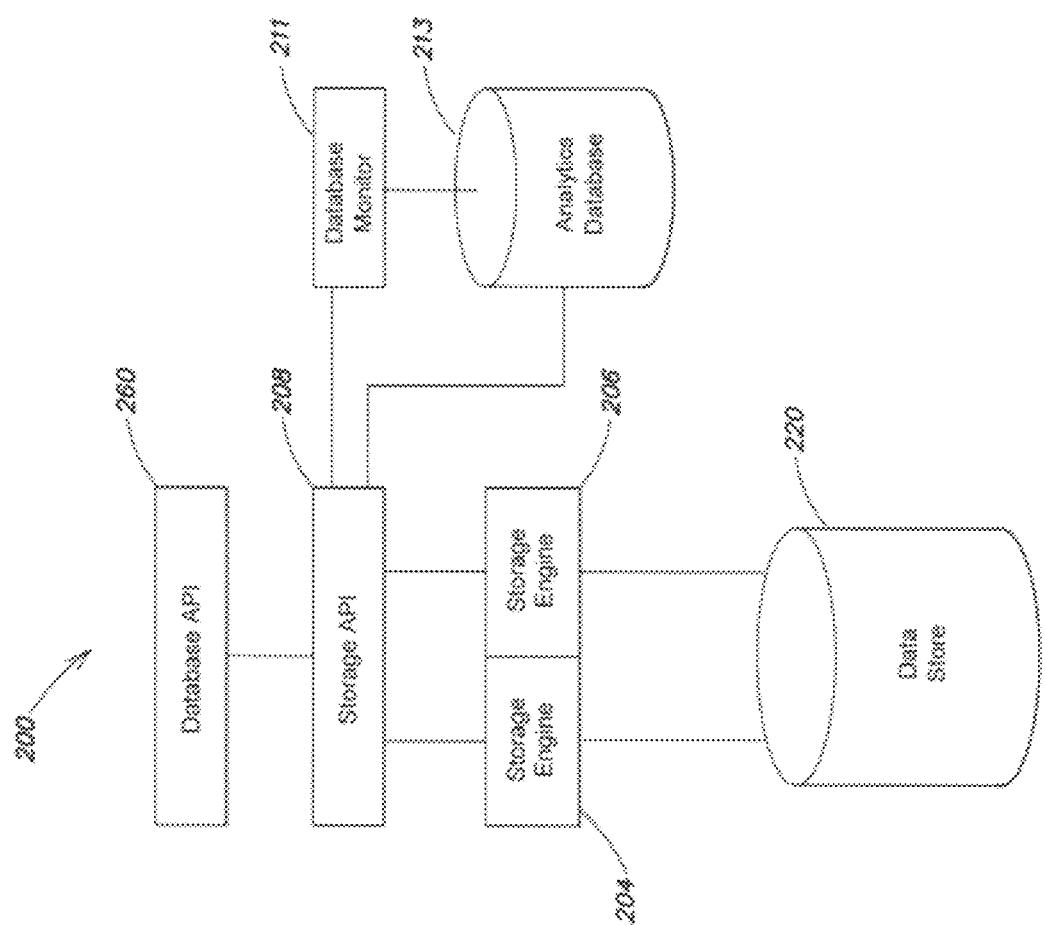
FIG. 4 illustrates a block diagram of an exemplary arrangement of components of a managed database subsystem, according to aspects of the invention.

FIG. 4 shows a block diagram of an exemplary arrangement of a storage API 208, storage engines 204, 206, a database API 260, and other components of a managed database subsystem 200. The storage API 208 is configured to receive database operation requests from the database API 260. The database API 260, in turn, may receive instructions from an application or from a user submitting query language or otherwise providing instructions for performing operations associated with data in the managed database. In one example, the database API 260 is the primary interface through which programs and users interact with the data on the managed database subsystem 200. In one embodiment, the database API 260 passes a "write" operation request to the storage API 208. The storage API 208 then determines an appropriate data format in which to store the subject data of the requested write operation, and calls an appropriate storage engine (e.g., first storage engine 204 or second storage engine 206) configured to store the data in the appropriate data format in a data store 220. In some embodiments, the storage API 208 and/or a database monitor 211 may determine the appropriate data format based on analytics data 213 and other aspects of the data stored.

In an embodiment incorporating a replica set, a primary node executes a write operation on data, then passes the operation through an associated API (e.g., the database API 260) to a storage engine API 208. The storage API 208 in turn passes the write operation to a particular storage engine (e.g., storage engine 204), which would be responsible for any transformation or mapping of the data as required by the storage engine. The storage engine, upon receiving the request, stores the data in a storage format associated with the storage engine. In some embodiments, the storage engine may also perform any additional transformations or mappings of the data.

In one example, the storage API 208 is a set of protocols, functions, and data used by the database API 260 to perform operations on the database. In other words, the API as discussed herein provides both the programming interface to which commands are passed, as well as the underlying data and functionality for carrying out those commands. For example, the storage API 208 may provide functions for performing operations on the database, including write operations, read operations, or commit operations. Any necessary data or variables are passed to such functions, the details of which are carried out by the functionality of the storage API 208. The storage API 208 may be configured to perform operations on the nodes (e.g., primary node or secondary nodes) of a replica set, as discussed in more detail below with respect to FIG. 5.

In some embodiments, the storage API 208 is in direct communication with the database API 260. In other embodiments, including those in which the managed database subsystem 200 is located on a server connected by a network to other database components, the storage API 208 may be in communication with a network interface configured to receive requests from the database API 260 and pass them to the storage API 208.

The first storage engine 204 and second storage engine 206 are configured to store database data in the data store 220 in one or more data formats. The embodiments discussed in this application discuss a non-relational database scenario. In such scenarios, a "document" is a collection of attribute-value associations relating to a particular entity, and in some examples forms a base unit of data storage for the managed database system. Attributes are similar to rows in a relational database, but do not require the same level of organization, and are therefore less subject to architectural constraints. A collection is a group of documents that can be used for a loose, logical organization of documents. It should be appreciated, however, that the concepts discussed herein are applicable to relational databases and other database formats, and this disclosure should not be construed as being limited to non-relational databases in the disclosed embodiments.

In one example, the database data may include logical organizations of subsets of database data. In one embodiment, the data is a collection of documents or other structures in a non-relational database—referred to as a collection. The data store 220 may also store index data, which may include copies of certain columns of data that are logically ordered to be searched efficiently. Each entry in the index may consist of a key-value pair that represents a document or field (i.e., the value), and provides an address or pointer to a low-level disk block address where the document or field is stored (the key). The data store 220 may also store an operation log ("oplog"), which is a chronological list of write/update operations performed on the data store during a particular time period. The oplog can be used to roll back or re-create those operations should it become necessary to do so due to a database crash or other error.

Primary data, index data, or oplog data may be stored in any of a number of database formats, including row store, column store, log-structured merge (LSM) tree, or otherwise. In row store format, all of the columns of a particular document are stored together in memory. For example, in a database of employee information, all of the information about a particular employee (e.g., name, address, SSN, salary, title) may be stored in a contiguous block of memory.

In integrating offline storage, the storage engine can generate metadata or other information specifying the details of virtual collections that exist in the offline data store. Like collections described herein, similar architectures exist for executing reads, writes, etc., except that the underlying data is not readily accessible. Once a request is received for offline data, the storage engine and/or the database application itself can request instantiation or assignment of compute resources to bring the offline data onto executing resources, and use the metadata of virtual collection information to optimize data operations on data that is the target of the request.

Returning again to FIG. 3, the storage API 108 receives database write requests (e.g., from database API 160) via a network interface 102, and carries out the requested operations by selectively triggering one of the first storage engine 104 and the second storage engine 106. The first storage engine 104 and the second storage engine 106 are executable software modules configured to store database data in the data node 110 in one or more data format. For example, the first storage engine 104 may be configured to store data in a row-store format, and the second storage engine 106 may be configured to store data in a LSM-tree format. In one example, the first storage engine 104 and/or the second storage engine 106 are configured store primary database data (i.e., the data being stored and queried) in a particular data format in the primary data storage 112, and may store database index data in a particular data format in index data storage 114. In one embodiment, the first storage engine 104 and/or the second storage engine 106 are configured store an oplog 116 in a particular data format. As discussed in more detail below, a database monitor 111 may track a number of analytics about the database, and the operations performed on it over time, and stores that information as analytics data 113. In some embodiments, analytics data about the performance of the storage engines may be stored as part of the first storage engine 104 and/or the second storage engine 106, and may not be stored separately as analytics data 113.

One advantage of using the storage API 108 as an abstraction layer between the database API and the storage engines is that the identity and selection of a particular storage engine can be transparent to the database API and/or a user interacting with the database API. For example, the database API may pass a "write" function call to the storage API 108 instructing the storage API to write a particular set of data to stable storage. The storage API 108 then determines, according to its own analysis and/or user input, which storage engine should perform the write operation in which data format. Different storage engines may be appropriate for different types of data stored in different collections that may undergo a variety of different operations. Thus, the choice and implementation of calls to an appropriate storage engine are made by the storage API 108, freeing the database API calls to simply request a "write" of certain data. This abstraction level allows for the implementation of the system on large filesystems that may be stored across machines in a database cluster.

Another advantage of using the storage API 108 is the ability to add, remove, or modify storage engines without modifying the requests being passed to the API 108. The storage API 108 is configured to identify the available storage engines and select the appropriate one based on a one or more factors discussed below. The database API requesting write operations need not know the particulars of the storage engine selection or operation, meaning that storage engines may be embodied in pluggable modules that may be swapped out or modified. Thus, users are able to leverage the same query language, data model, scaling, security and operational tooling across different applications, each powered by different pluggable storage engines. According to various embodiments, the systems can include a variety of offline storage engines configured to store, retrieve and operate on different virtual collections of offline data.

Figure 5:
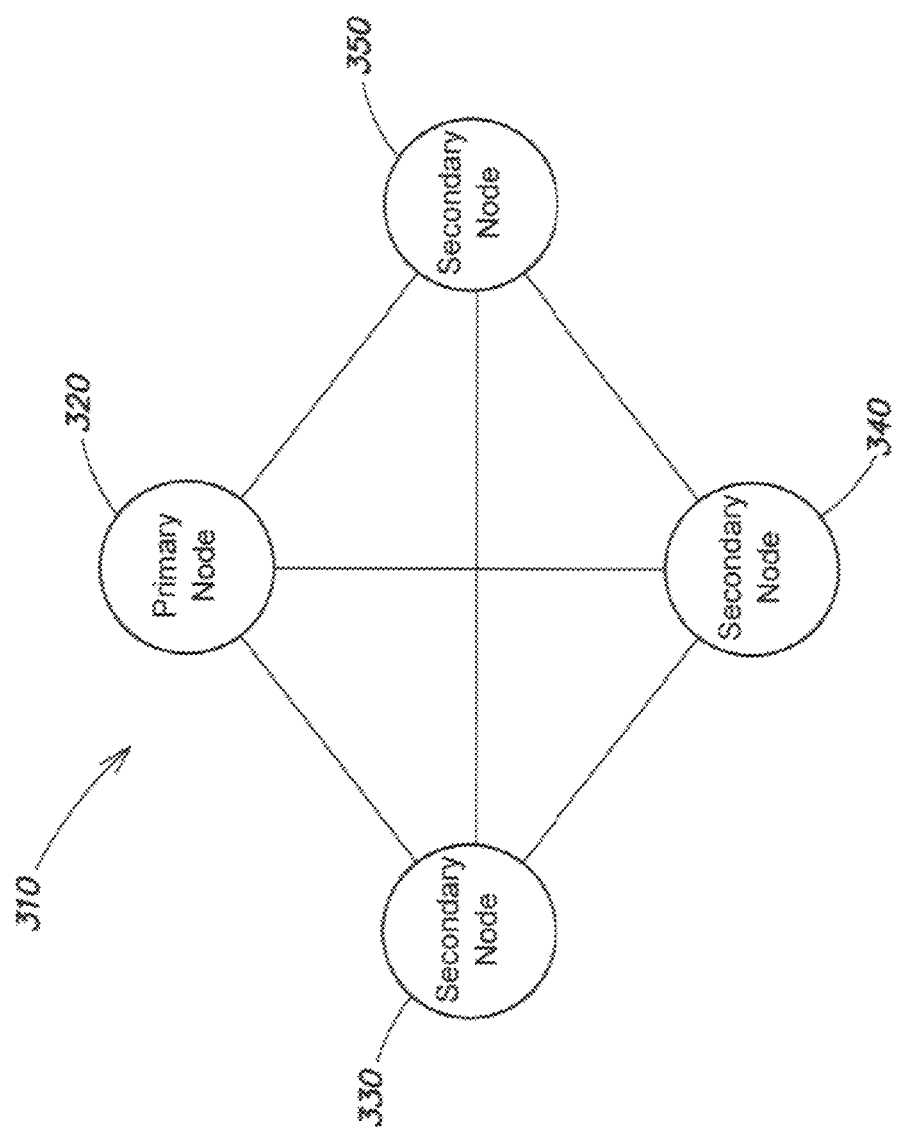
FIG. 5 shows a block diagram of an exemplary replica set, according to aspects of the invention.

The embodiment shown and discussed with respect to FIG. 3 depicts a single storage node 110. Yet in some embodiments, multiple database nodes may be provided and arranged in a replica set. FIG. 5 shows a block diagram of an exemplary replica set 310. Replica set 310 includes a primary node 320 and one or more secondary nodes 330, 340, 350, each of which is configured to store a dataset that has been inserted into the database. The primary node 320 may be configured to store all of the documents currently in the database, and may be considered and treated as the authoritative version of the database in the event that any conflicts or discrepancies arise, as will be discussed in more detail below. While three secondary nodes 330, 340, 350 are depicted for illustrative purposes, any number of secondary nodes may be employed, depending on cost, complexity, and data availability requirements. In a preferred embodiment, one replica set may be implemented on a single server. In other embodiments, the nodes of the replica set may be spread among two or more servers.

The primary node 320 and secondary nodes 330, 340, 350 may be configured to store data in any number of database formats or data structures as are known in the art. In a preferred embodiment, the primary node 320 is configured to store documents or other structures associated with non-relational databases. The embodiments discussed herein relate to documents of a document-based database, such as those offered by MongoDB, Inc. (of New York, N.Y. and Palo Alto, Calif.), but other data structures and arrangements are within the scope of the disclosure as well.

In one embodiment, both read and write operations may be permitted at any node (including primary node 320 or secondary nodes 330, 340, 350) in response to requests from clients. The scalability of read operations can be achieved by adding nodes and database instances. In some embodiments, the primary node 320 and/or the secondary nodes 330, 340, 350 are configured to respond to read operation requests by either performing the read operation at that node or by delegating the read request operation to another node (e.g., a particular secondary node 330). Such delegation may be performed based on load-balancing and traffic direction techniques known in the art.

In some embodiments, the database only allows write operations to be performed at the primary node 320, with the secondary nodes 330, 340, 350 disallowing write operations. In such embodiments, the primary node 320 receives and processes write requests against the database, and replicates the operation/transaction asynchronously throughout the system to the secondary nodes 330, 340, 350. In one example, the primary node 320 receives and performs client write operations and generates an oplog. Each logged operation is replicated to, and carried out by, each of the secondary nodes 330, 340, 350, thereby bringing those secondary nodes into synchronization with the primary node 320. In some embodiments, the secondary nodes 330, 340, 350 may query the primary node 320 to receive the operation log and identify operations that need to be replicated. In other embodiments, the operation log may be transmitted from the primary node 320 to the secondary nodes 330, 340, 350 periodically or in response to the occurrence of a predefined condition, such as accruing a threshold number of operations in the operation log that have not yet been sent to the secondary nodes 330, 340, 350.

In some embodiments, the primary node 320 and the secondary nodes 330, 340, 350 may operate together to form a replica set 310 that achieves eventual consistency, meaning that replication of database changes to the secondary nodes 330, 340, 350 may occur asynchronously. When write operations cease, all replica nodes of a database will eventually "converge," or become consistent. This may be a desirable feature where higher performance is important, such that locking records while an update is stored and propagated is not an option. In such embodiments, the secondary nodes 330, 340, 350 may handle the bulk of the read operations made on the replica set 310, whereas the primary node 330, 340, 350 handles the write operations. For read operations where a high level of accuracy is important (such as the operations involved in creating a secondary node), read operations may be performed against the primary node 320.

It will be appreciated that the difference between the primary node 320 and the one or more secondary nodes 330, 340, 350 in a given replica set may be largely the designation itself and the resulting behavior of the node; the data, functionality, and configuration associated with the nodes may be largely identical, or capable of being identical. Thus, when one or more nodes within a replica set 310 fail or otherwise become available for read or write operations, other nodes may change roles to address the failure. For example, if the primary node 320 were to fail, a secondary node 330 may assume the responsibilities of the primary node, allowing operation of the replica set to continue through the outage. This failover functionality is described in U.S. application Ser. No. 12/977,563, the disclosure of which is hereby incorporated by reference.

Each node in the replica set 310 may be implemented on one or more server systems. Additionally, one server system can host more than one node. Each server can be connected via a communication device to a network, for example the Internet, and each server can be configured to provide a heartbeat signal notifying the system that the server is up and reachable on the network. Sets of nodes and/or servers can be configured across wide area networks, local area networks, intranets, and can span various combinations of wide area, local area and/or private networks. Various communication architectures are contemplated for the sets of servers that host database instances and can include distributed computing architectures, peer networks, virtual systems, among other options.

The primary node 320 may be connected by a LAN, a WAN, or other connection to one or more of the secondary nodes 330, 340, 350, which in turn may be connected to one or more other secondary nodes in the replica set 310. Connections between secondary nodes 330, 340, 350 may allow the different secondary nodes to communicate with each other, for example, in the event that the primary node 320 fails or becomes unavailable and a secondary node must assume the role of the primary node. Further details of an exemplary distributed database system that can be used to implement the techniques described herein can be found in U.S. Pat. No. 10,262,050, which is hereby incorporated by reference herein.

Figure 6:
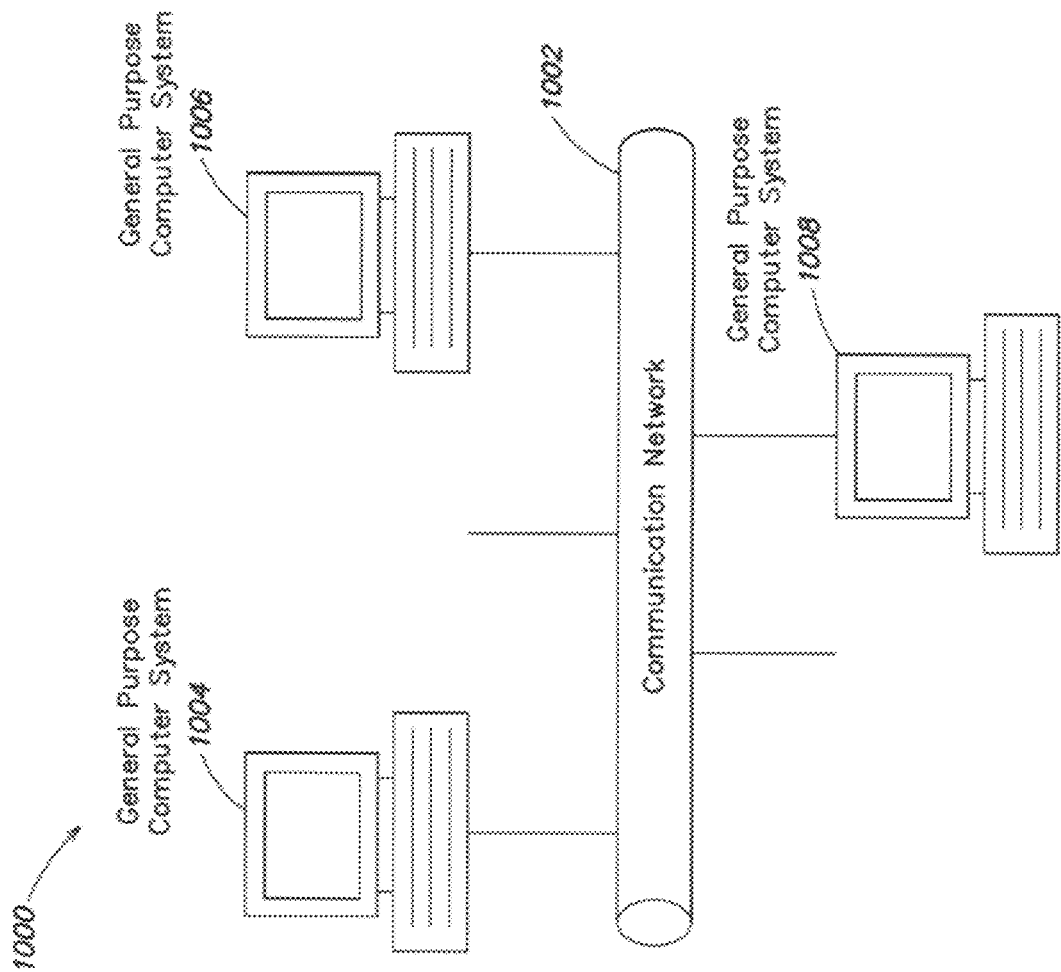
FIG. 6 illustrates an architecture diagram of an example distributed system suitable for implementing various aspects of the invention.

FIG. 6 shows an architecture diagram of an example distributed system 1000 suitable for implementing various aspects of the invention. It should be appreciated that FIG. 6 is used for illustration purposes only, and that other architectures can be used to facilitate one or more aspects of the invention.

System 1000 may include one or more specially configured special-purpose computer systems 1004, 1006, and 1008 distributed among a network 1002 such as, for example, the Internet. Such systems may cooperate to perform functions related to hosting a partitioned database, managing database metadata, monitoring distribution of database partitions, monitoring size of partitions, splitting partitions as necessary, migrating partitions as necessary, identifying sequentially keyed collections, optimizing migration, splitting, and rebalancing for collections with sequential keying architectures.

Having thus described several aspects and embodiments of this invention, it is to be appreciated that various alterations, modifications and improvements will readily occur to those skilled in the art. Such alterations, modifications, and improvements are intended to be part of this disclosure, and are intended to be within the spirit and scope of the invention. Accordingly, the foregoing description is by way of example only.

Use of ordinal terms such as "first," "second," "third," "a," "b," "c," etc., in the claims to modify or otherwise identify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

What is claimed is:

1. A method of querying data hosted in a distributed database, the method comprising the steps of:
   receiving a query from a user device for the distributed database, wherein the distributed database comprises:
      first object data stored in a first data center at a first geographical location, wherein the first object data comprises a first set of objects, wherein each object of the first set of objects comprises an associated object name and including a set of ordered fields; and
      second object data stored in a second data center at a second geographical location, wherein the second object data comprises a second set of objects, wherein each object of the second set of objects comprises an associated object name and including a set of ordered fields;
   determining the query is for at least a portion of the first object data stored by the first data center;
   transmitting the query to a first computing device in the first data center;
   processing at least a portion of the query using a partition mapping syntax to specify a partition associated with the portion of the query using a range of a field, wherein the partition comprises:
      a set of partition objects comprising a subset of a first set of objects in the first object data, a subset of a second set of objects in the second object data, or both;
      wherein responsive objects in the set of partition objects comprise an associated object name with a field value within the range of the field;
   receiving results from the first computing device for the query; and
   providing the results to the user device in response to the received query.

2. The method of claim 1, wherein the first computing device is configured to:
   distribute:
      a first portion of the query to a second computing device in the first data center to query a first portion of the first object data; and
      a second portion of the query to a third computing device in the first data center to query a second portion of the first object data,
      such that the second computing device and the third computing device can read the respective first and second portions of the first object data and perform the respective first and second portion of the query in parallel;
   receive results from the second computing device and third computing device responsive to the second computing device and third computing device performing the respective first and second portion of the query; and
   combine the results.

3. The method of claim 1, further comprising accessing a storage configuration file to configure the distributed database, wherein the storage configuration file comprises data indicative of:
   a first data store comprising the first object data and a second data store comprising the second object data; and
   a collection within the first data store comprising a subset of data from the first data store, a subset of data from the second data store, or both.

4. The method of claim 3,
   wherein the storage configuration file further comprises data indicative of one or more of:
      a third data store comprising an online database cluster; and
      a fourth data store comprising a Hypertext Transfer Protocol (HTTP) store; and
   the method further comprises processing the storage configuration file to determine a collection comprising the first data store, the second data store, and one or more of the third data store and the fourth data store.

5. The method of claim 4, wherein the first computing device is configured to distribute:
   a first portion of the query to a second computing device in the first data center to query the first data store; and
   a second portion of the query to a third computing device to query the online database cluster.

6. The method of claim 4, wherein the first computing device is configured to distribute:
   a first portion of the query to a second computing device in the first data center to query the first data store; and
   a second portion of the query to a third computing device to query the HTTP store.

7. The method of claim 1, wherein:
   the first set of objects are in a first collection within a first data store;
   the second set of objects are in a second collection within the first data store; and
   the method further comprises accessing a storage configuration file to configure the distributed database, wherein the storage configuration file:
      specifies the first collection using a first keyword comprising a first set of field values that matches the object names of the objects in the first set of objects to determine the first collection; and
      specifies the second collection using a second keyword comprising a second set of field values that matches the object names of the objects in the second set of objects to determine the second collection.

8. The method of claim 1, further comprising writing the results of the query to the distributed database.

9. The method of claim 1, further comprising writing the results of the query to an online database cluster.

10. A non-transitory computer-readable media comprising instructions that, when executed by one or more processors on a computing device, are operable to cause the one or more processors to perform:
    receiving a query from a user device for the distributed database, wherein the distributed database comprises:
       first object data stored in a first data center at a first geographical location, wherein the first object data comprises a first set of objects, wherein each object of the first set of objects comprises an associated object name and including a set of ordered fields; and
       second object data stored in a second data center at a second geographical location wherein the second object data comprises a second set of objects, wherein each object of the second set of objects comprises an associated object name and including a set of ordered fields;

determining the query is for at least a portion of the first object data stored by the first data center;

transmitting the query to a first computing device in the first data center;

processing at least a portion of the query using a partition mapping syntax to specify a partition associated with the portion of the query using a range of a field, wherein the partition comprises:
- a set of partition objects comprising a subset of a first set of objects in the first object data, a subset of a second set of objects in the second object data, or both;
- wherein responsive objects in the set of partition objects comprise an associated object name with a field value within the range of the field;

receiving results from the first computing device for the query; and providing the results to the user device in response to the received query.

11. The non-transitory computer-readable media of claim 10, wherein the first computing device is configured to: distribute:
- a first portion of the query to a second computing device in the first data center to query a first portion of the first object data; and
- a second portion of the query to a third computing device in the first data center to query a second portion of the first object data,
- such that the second computing device and the third computing device can read the respective first and second portions of the first object data and perform the respective first and second portion of the query in parallel;

receive results from the second computing device and third computing device responsive to the second computing device and third computing device performing the respective first and second portion of the query; and combine the results.

12. The non-transitory computer-readable media of claim 10, wherein the instructions are further operable to cause the one or more processors to perform accessing a storage configuration file to configure the distributed database, wherein the storage configuration file comprises data indicative of:
- a first data store comprising the first object data and a second data store comprising the second object data; and
- a collection within the first data store comprising a subset of data from the first data store, a subset of data from the second data store, or both.

13. The non-transitory computer-readable media of claim 12, wherein the storage configuration file further comprises data indicative of one or more of:
- a third data store comprising an online database cluster; and
- a fourth data store comprising a Hypertext Transfer Protocol (HTTP) store; and the method further comprises processing the storage configuration file to determine a collection comprising the first data store, the second data store, and one or more of the third data store and the fourth data store.

14. The non-transitory computer-readable media of claim 13, wherein the first computing device is configured to distribute:
- a first portion of the query to a second computing device in the first data center to query the first data store; and
- a second portion of the query to a third computing device to query the online database cluster.

15. The non-transitory computer-readable media of claim 13, wherein the first computing device is configured to distribute:
- a first portion of the query to a second computing device in the first data center to query the first data store; and
- a second portion of the query to a third computing device to query the HTTP store.

16. A system comprising a memory storing instructions, and a processor configured to execute the instructions to perform:

receiving a query from a user device for the distributed database, wherein the distributed database comprises:
- first object data stored in a first data center at a first geographical location, wherein the first object data comprises a first set of objects and the first set of objects comprises an associated object name and including a set of ordered fields; and
- second object data stored in a second data center at a second geographical location wherein the second object data comprises a second set of objects the second set of objects comprises an associated object name and including a set of ordered fields;

determining the query is for at least a portion of the first object data stored by the first data center;

transmitting the query to a first computing device in the first data center;

processing at least a portion of the query using a partition mapping syntax to specify a partition associated with the portion of the query using a range of a field, wherein the partition comprises:
- a set of partition objects comprising a subset of a first set of objects in the first object data, a subset of a second set of objects in the second object data, or both;
- wherein responsive objects in the set of partition objects comprise an associated object name with a field value within the range of the field;

receiving results from the first computing device for the query; and providing the results to the user device in response to the received query.

* * * * *